(12) United States Patent
Cahoy et al.

(10) Patent No.: US 10,826,609 B2
(45) Date of Patent: Nov. 3, 2020

(54) LIQUID-LENS BASED OPTICAL STEERING SYSTEM FOR FREE-SPACE LASER COMMUNICATION

(71) Applicant: Massachusetts Institute of Technology, Cambridge, MA (US)

(72) Inventors: Kerri Cahoy, Lexington, MA (US); Christian Haughwout, Clinton, CT (US); James Clark, Cambridge, MA (US); Paula do Vale Pereira, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/447,648

(22) Filed: Jun. 20, 2019

(65) Prior Publication Data
US 2020/0007232 A1    Jan. 2, 2020

Related U.S. Application Data

(60) Provisional application No. 62/687,604, filed on Jun. 20, 2018.

(51) Int. Cl.
*H04B 10/00* (2013.01)
*H04B 10/118* (2013.01)
(Continued)

(52) U.S. Cl.
CPC ......... *H04B 10/118* (2013.01); *B64G 1/1007* (2013.01); *B64G 1/222* (2013.01);
(Continued)

(58) Field of Classification Search
CPC .................................................. H04B 10/118
See application file for complete search history.

(56) References Cited

U.S. PATENT DOCUMENTS

| 4,755,818 A | 7/1988 | Conrad |
| 7,324,287 B1 | 1/2008 | Gollier |
| (Continued) | | |

OTHER PUBLICATIONS

"Wide-angle Nonmechanical Beam Steering Using Liquid Lenses", Zohrabi et al., Optics Express, vol. 24, No. 21, pp. 23798-23809, Oct. 17, 2016 (Year: 2016).*
(Continued)

*Primary Examiner* — Daniel G Dobson
(74) *Attorney, Agent, or Firm* — Smith Baluch LLP

(57) ABSTRACT

A beam steering system for a free-space laser communication system in a satellite includes a laser that emits a laser beam, a liquid lens assembly with at least one liquid lens to change the direction of the laser beam, and an amplifying optic to amplify the change in direction of the laser beam. The beam steering system may be used to steer a laser beam transmitted to another satellite or received from another satellite. In one example, a satellite may include two beam steering systems, disposed at opposing ends of a frame, where each steering system is configured to cover a hemisphere such that together, the steering systems can transmit and/or receive a laser beam over a $4\pi$ steradian sphere. The beam steering system may include a transmit feedback system and a reception system to monitor the direction and signal of the transmitted beam and the received beam, respectively.

16 Claims, 31 Drawing Sheets
(4 of 31 Drawing Sheet(s) Filed in Color)

(51) Int. Cl.
   G02F 1/29      (2006.01)
   H04B 10/50     (2013.01)
   B64G 1/10      (2006.01)
   B64G 1/22      (2006.01)
   H04J 14/00     (2006.01)
(52) U.S. Cl.
   CPC .............. *G02F 1/29* (2013.01); *H04B 10/503* (2013.01); *G02F 2001/294* (2013.01); *G02F 2203/24* (2013.01)

(56) References Cited

U.S. PATENT DOCUMENTS

| | | | |
|---|---|---|---|
| 9,123,988 B2 | 9/2015 | Irvine | |
| 9,843,388 B1 | 12/2017 | Astakhov et al. | |
| 2008/0118247 A1* | 5/2008 | Drago | H04B 10/118 398/122 |

OTHER PUBLICATIONS

Acousto-Optic Deflectors. Brimrose. Accessed at https://www.brimrose.com/acousto-optic-deflectors/ on Oct. 24, 2019.

Blackwell et al., "Radiometer calibration using colocated GPS radio occultation measurements." IEEE Transactions on Geoscience and Remote Sensing 52.10 (2014): 6423-6433.

Cahoy et al., "Wavefront control in space with MEMS deformable mirrors for exoplanet direct imaging." Journal of Micro/Nanolithography, MEMS, and MOEMS 13.1 (2013): 011105. 15 pages.

Carrasco-Casado et al. "Optical communication on CubeSats—Enabling the next era in space science." 2017 IEEE International Conference on Space Optical Systems and Applications (ICSOS). IEEE, 2017.

Clements et al., "Interplanetary space weather effects on Lunar Reconnaissance Orbiter avalanche photodiode performance." Space Weather 14.5 (2016): 343-350.

Clements et al., "Nanosatellite optical downlink experiment: design, simulation, and prototyping." Optical Engineering 55.11 (2016): 111610. 19 pages.

Cook et al., "Planetary Imaging Concept Testbed Using a Recoverable Experiment—Coronagraph (Picture C)." Journal of Astronomical Telescopes, Instruments, and Systems 1.4 (2015): 044001. 8 pages.

Corning® Varioptic® Lenses. Corning 2018. 26 pages.

Davis, True Analog Non-Mechanical Beam Steering Using Liquid Crystal Waveguide Techniques. Vescent Photonics 2015. Accessed at https://www.vescent.com/wp-content/uploads/2015/05/SEEOR.pdf. 5 pages.

Derose et al., "Electronically controlled optical beam-steering by an active phased array of metallic nanoantennas." Optics express 21.4 (2013): 5198-5208.

Development Kits. Corning® Varioptic® Lenses. Accessed at https://www.corning.com/worldwide/en/innovation/corning-emerging-innovations/corning-varioptic-lenses/varioptic-development-kits.html on Oct. 24, 2019. 8 pages.

Electrically tunable large aperture lens EL-16-40-TC-VIS-20D. Datasheet: EL-16-40-TC-VIS-20D. Optotune May 28, 2018. 7 pages.

Fine Angle Beam Steering. Boulder Nonlinear Systems 2016. Accessed at http://bnonlinear.com/research-development/beam-steering/fine-angle-beam-steering on Oct. 24, 2019. 3 pages.

Kennedy et al., "Performance analysis of algorithms for coordination of earth observation by cubesat constellations." Journal of Aerospace Information Systems 14.8 (2016): 451-471.

Lai et al., "Trapped photoelectrons during spacecraft charging in sunlight." IEEE Transactions on Plasma Science 43.9 (2015): 2856-2860.

Liquid Lens Technology. Cognex Corporation. Accessed at https://www.cognex.com/products/leading-technology/liquid-lens-technology on Oct. 24, 2019. 5 pages.

Lohmeyer et al., "Communication satellite power amplifiers: current and future SSPA and TVVTA technologies." International journal of satellite communications and networking 34.2 (2016): 95-113.

Lohmeyer et al., "Response of geostationary communications satellite solid-state power amplifiers to high-energy electron fluence." Space Weather 13.5 (2015): 298-315.

Marinan et al., "Assessment of radiometer calibration with gps radio occultation for the mirata cubesat mission." IEEE journal of selected topics in applied earth observations and remote sensing 9.12 (2016): 5703-5714.

Marlow et al., "Laser-guide-star satellite for ground-based adaptive optics imaging of geosynchronous satellites." Journal of Spacecraft and Rockets 54.3 (2017): 621-639.

Miller et al., "A prototype coarse pointing mechanism for laser communication." Free-Space Laser Communication and Atmospheric Propagation XXIX. vol. 10096. International Society for Optics and Photonics, 2017.

Zohrabi et al., "Wide-angle nonmechanical beam steering using liquid lenses." Optics express 24.21 (2016): 23798-23809.

Morley et al., "Thermal emission and reflected light spectra of super Earths with flat transmission spectra." The Astrophysical Journal 815.2 (2015): 110. 22 pages.

Optotune Electrical Lens Driver. Edmund Optics Products. Accessed at https://www.edmundoptics.com/p/optotune-electrical-lens-driver-87590/29943/ on Oct. 24, 2019. 2 pages.

Optotune Electrically Focus-Tunable Lenses. Edmund Optics Products. Accessed at https://www.edmundoptics.com/f/optotune-electrically-focus-tunable-lenses/14284/ on Oct. 24, 2019. 2 pages.

Rose et al., "LEO to ground optical communications from a small satellite platform." Free-Space Laser Communication and Atmospheric Propagation XXVII. vol. 9354. International Society for Optics and Photonics, 2015.

Tholl, "Novel laser beam steering techniques." Technologies for Optical Countermeasures III. vol. 6397. International Society for Optics and Photonics, 2006.

Understanding Liquid Lens Technology. Edmund Optics Video Resources Mar. 8, 2016. Accessed at https://www.edmundoptics.com/resources/video/tutorials/understanding-liquid-lens-technology/. 8 pages.

Webber et al., "Effect of longitude-dependent cloud coverage on exoplanet visible wavelength reflected-light phase curves." The Astrophysical Journal 804.2 (2015): 94. 12 pages.

Withers et al., "How to process radio occultation data: 1. From time series of frequency residuals to vertical profiles of atmospheric and ionospheric properties." Planetary and Space Science 101 (2014): 77-88.

Yoon et al., "Interpolation Method for Update with Out-of-Sequence Measurements: The Augmented Fixed-Lag Smoother." Journal of Guidance, Control, and Dynamics (2016): 2546-2553.

Yoon et al., "Kalman filtering for attitude and parameter estimation of nanosatellites without gyroscopes." Journal of Guidance, Control, and Dynamics 40.9 (2017): 2272-2288.

International Search Report and Written Opinion in International Patent Application No. PCT/US2019/038279 dated Nov. 1, 2019, 17 pages.

* cited by examiner

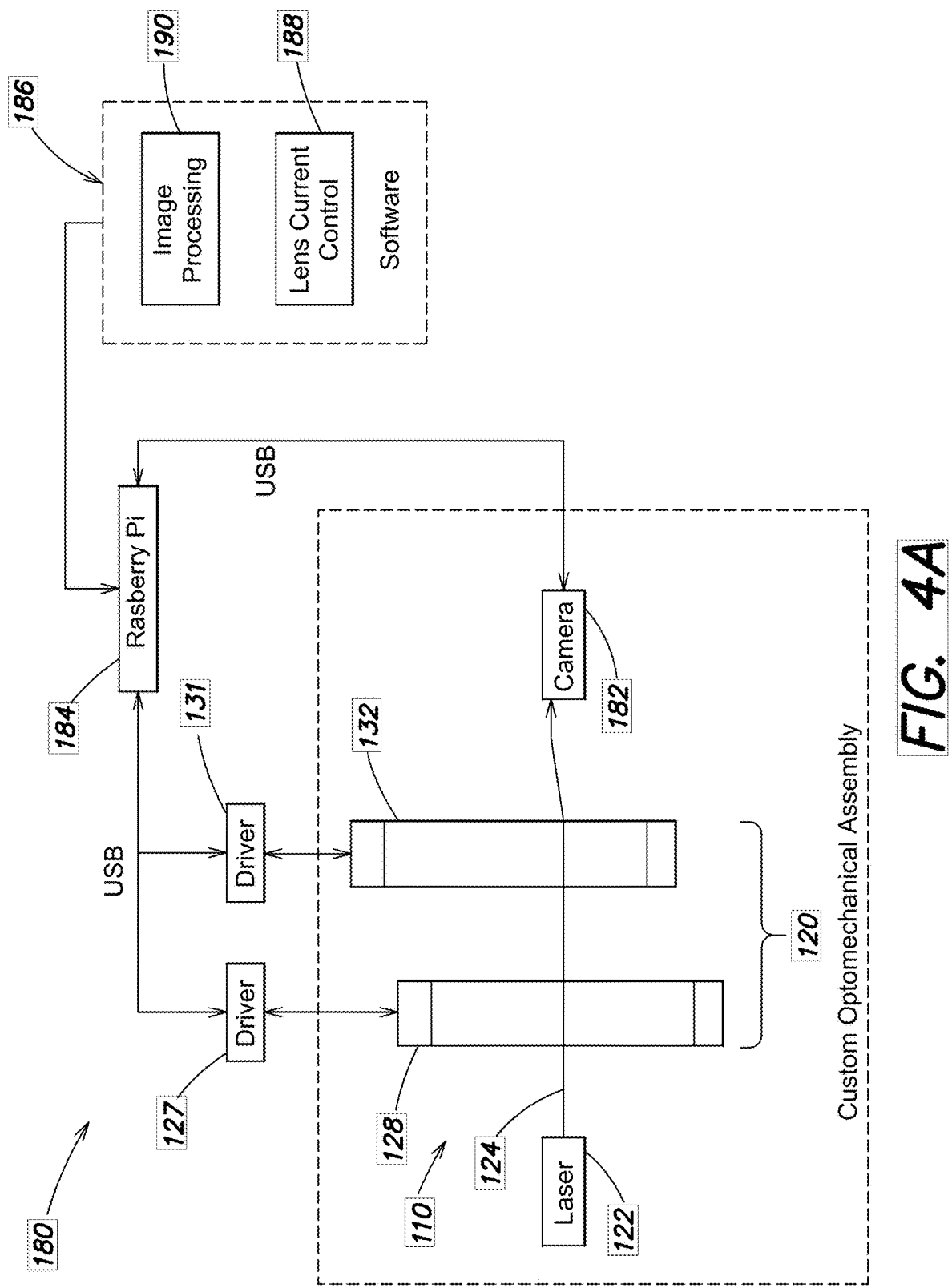

Main specifications

| | | |
|---|---|---|
| Clear aperture | 16 | mm |
| Optical power: tuning range @ 30° C with the lens configuration | -10 to +10 | dpt |
| Wavefront error(@525 nm, 0 mA0) Optical axis vertical/horizontal | ~0.5/~2.5 (due to gravity coma) | $\lambda$ RMS |
| Lens Type | plano-concave to plano-convex | |
| Refractive index & Abbe number | nD=1,300, V=100 | |
| Cover glass coating | 420 to 950[1] | nm |
| Optical retardance @590nm | 6.1 | nm |
| Response time (typical @ 30° C, 0 to +/-250mA step) | 7 | ms |
| Settling time (typical at 30° C, 0 to +/- 250mA step) | 40 | ms |
| Lifecycles (10%-90% sinusoidal) | >1'000'000'000 | |
| Operating temperature | -20 to 65 | °C |
| Storage temperature | -40 to 85 | °C |
| Weight | 40 | °G |

Electrical specifications

| | | |
|---|---|---|
| Nominal control current with the lens | -250 to 250 | mA |
| Absolute max. control current | -300 to 300 | mA |
| Power consumption | 0 to 0.7 (nominal), 0 to 1 (absolute max) | W |
| Motor coil resistance at 30° C | 11 | Ω |
| Volatge for digital circuitry Vcc | 3.3 | V |

FIG. 5C

Table 4.2.1 Steering Capability Summary

|  | Ambient | Vacuum |
|---|---|---|
| Right Steer (30V) | 1.4061° | 1.3930° |
| Left Steer (59V) | -1.3143° | -1.3151° |
| Total Steer | 2.7204° | 2.7082° |
| Approx. Slope | 0.0461°/V | 0.0459°/V |

FIG. 7A

LIQUID-LENS BASED OPTICAL STEERING SYSTEM FOR FREE-SPACE LASER COMMUNICATION

CROSS-REFERENCE TO RELATED PATENT APPLICATION(S)

This application claims priority to U.S. Provisional Application No. 62/687,604, filed on Jun. 20, 2018, entitled "OPTICALLY-STEERED OMNI-ANTENNA FOR FREE-SPACE LASER COMMUNICATION," which is incorporated herein by reference in its entirety.

GOVERNMENT SUPPORT STATEMENT

This invention was made with Government support under Grant No. 80NSSC19K0217 awarded by the NASA Shared Services Center. The Government has certain rights to the invention.

BACKGROUND

The advent of commercially affordable satellites has advanced current efforts to commercialize space. In particular, the miniaturization of satellite technology (e.g., a CubeSat) has enabled the deployment of multiple satellites during a single launch. These satellites may generally be configured for various applications, such as distributed sensing, where the satellites communicate with other satellites via a cross-link. As constellations of hundreds or even thousands of satellites become more common, each satellite may have to precisely track and locate another satellite in order to communicate with one or more satellites in the constellation.

One approach is to use a free-space laser communication system in which a satellite may transmit and/or receive a signal from another satellite via a laser beam. Free-space laser communication systems provide sufficient precision to identify and track a satellite (e.g., the size of the laser beam is sufficiently small to discriminate between multiple satellites in close proximity to one another), enabling high data rates. Additionally, free-space laser communication systems provide a higher power efficiency and greater security while using less bandwidth when compared to other communication technologies. However, a free-space laser communication system on a satellite should also be paired with a steering system to orient the laser beam towards a desired target (e.g., another satellite).

SUMMARY

The Inventors have recognized and appreciated that a multiple access free-space optical terminal on a satellite may enable the creation of a network of connected satellites. A network of satellites may enable greater, uninterrupted coverage across the Earth, especially if larger constellations of satellites are deployed at lower orbits (e.g., low Earth orbit). This may allow for better navigational services (e.g., a Global Positioning System), telecommunication services (e.g., the Internet, a cellular network), and higher fidelity monitoring of the Earth (e.g., mapping Earth's atmospheric conditions).

However, the Inventors have also recognized that previous steering mechanisms deployed on a satellite to point a free-space laser communication system towards other satellites have typically relied upon mechanical mechanisms, which are large, heavy, and power intensive. For example, previous satellites with laser communication systems (e.g. the Lunar Laser Communication Demonstration, Optical Communication Satellite Demonstration) have used body-pointing mechanisms (e.g., a reaction wheel) to orient the entire spacecraft, which consumes a portion of the operating lifetime of the satellite for laser communication. In another example, a mechanical gimbal actuated by a motor may be used for coarse steering of the laser communication system and an internal fine steering mirror may be used as a second stage for intermittent fine steering. Conventional gimbals and motors are typically deployed in larger satellites. However, the size, weight, and power input of the gimbal prevents their use in smaller satellites (e.g., a CubeSat) where space, payload mass, and spare power are more limited.

Other technologies have been proposed as an onboard steering mechanism in a miniaturized satellite. For example, micro-electro-mechanical system (MEMS) fast-steering mirrors have been demonstrated previously by the Inventors in satellites with laser communication systems (e.g., the Nanosatellite Optical Downlink Experiment (NODE), the CubeSat Laser Infrared CrossLink (CLICK)). However, the Inventors found that MEMS fast-steering mirrors are limited in providing both a large throw (i.e., a large tilt range) and a compact form factor simultaneously. For instance, a compact MEMS fast-steering mirror from Mirrorcle, Inc. has a specified throw up to +/−7 degrees. In order to cover a hemisphere of steering, over 135 devices should be used on the satellite. The limited angular range and the inability to direct different beams along different directions simultaneously make MEMS fast-steering mirrors unsuitable as a steering mechanism.

Acousto-optic modulation was also proposed as another technique for fine beam steering, where a piezoelectric transducer vibrates a glass cell at high frequency (e.g., 10's-100's of MHz) to induce a diffraction pattern in the glass. A laser beam passing through the glass is deflected at an angle proportional to the vibration frequency. However, acousto-optic modulators tend to be bulky in size and less efficient at transmitting light with losses of 25% or more being common.

Liquid crystal waveguides and optical phased-arrays have also been demonstrated in laboratory settings for beam steering applications. However, these technologies have not sufficiently matured for widespread commercial use. Furthermore, optical phased arrays also produce side lobes, which represent power losses, that should be filtered to prevent the inadvertent illumination of objects (e.g., other satellites) that are not in communication with the satellite.

The present disclosure is thus directed to various inventive implementations of a beam steering system (also referred to herein as "steering system", "laser communication transmitter") using one or more liquid lenses to steer a laser beam for transmission and/or reception on a satellite. The steering system may include a laser source that emits a laser beam that passes through a liquid lens assembly. The liquid lens assembly may include at least one liquid lens that can change shape in response to an electrical input, thus changing the focal length of the lens.

By positioning the liquid lens such that the laser beam is incident at an offset from the center of the lens, alterations to the shape of the liquid lens may cause the laser beam to change direction. In some implementations, the liquid lens assembly may include three staged liquid lenses (e.g., one on-axis liquid lens, and two off-axis liquid lenses) to adjust a spot size and to steer along orthogonal X and Y axes. Additional optics may be used to amplify the angular deflection of the laser beam. For example, a fisheye lens may be used to substantially increase the range of angular adjustment, which may approach and, in some instances, reach a hemisphere (i.e., $2\pi$ steradians). The beam steering system may operate at various orbits including, but not limited to low Earth orbit (LEO), geosynchronous orbit (GEO), and deep space.

In one aspect, the use of liquid lenses in the beam steering system may replace conventional mechanical actuators (e.g., a body-pointing mechanism, a gimbal) previously used for steering. By eliminating the mechanical actuators, the satellite may have fewer mechanical components and thus fewer points where mechanical wear and failure can occur, resulting in a longer operational lifetime. The beam steering system may also be smaller and lighter than previous steering systems, enabling integration into nanosatellites (e.g., a CubeSat). When compared to MEMS fast-mirrors, liquid lenses may still exhibit a longer operational lifetime since the liquid lens may include no moving parts whereas a MEMS fast-mirror still relies upon electromechanical actuation of micro mirrors.

In another aspect, the beam steering system may include a fisheye lens to amplify the angular deflection of the laser beam. As described above, the beam steering system may exhibit a range of angular adjustment corresponding to a hemisphere. The hemisphere may be centered about a point located where the laser beam illuminates the fisheye lens (e.g., an optical axis of the fisheye lens). In some implementations, a satellite may include two beam steering systems disposed on opposing sides of the satellite frame, thus providing spherical coverage (e.g., $4\pi$ steradians) around the satellite where each beam steering system represents a free-space optical terminal on the satellite. The satellite may be configured to support handoff between the two beam steering systems where the satellite seamlessly switches between the two beam steering systems during operation.

By providing spherical coverage with two beam steering systems, the satellite may transmit or receive a laser beam from any direction without the body of the satellite moving and/or changing orientation. This enables the spacecraft to be oriented along a preferred direction based, in part, on the specifications of the mission. Additionally, the spacecraft may also be allowed to simultaneously maintain communications with a ground station and constellation companions located along any direction relative the spacecraft.

In another aspect, the beam steering system may steer multiple beams (e.g., at the same wavelength, at different wavelengths) simultaneously for transmission to other satellites and/or reception from multiple satellites. For example, the beam steering system may support two C-band channels (e.g., 1537 nm and 1565 nm) in the infrared wavelength range. In this manner, the beam steering system may provide a multiple access free-space optical terminal for a multi-satellite communication system.

In yet another aspect, a liquid lens in the liquid lens assembly may be used to adjust the beamwidth of the laser beam enabling multiple modes of operation. For example, a narrow beamwidth configuration may be used to provide higher signal rates and communication links to other satellites. A wider beamwidth configuration may be used to provide a beacon capability for pointing, acquisition, and tracking of other satellites.

In yet another aspect, the beam steering system may also include various feedback and detection systems. For example, a transmit detection system may be used to monitor the orientation and the signal (e.g., a portion of the transmitted laser beam is absorbed and converted to an electrical signal) of the laser beam transmitted by the satellite. A reception detection system may also be coupled to the liquid lens assembly to monitor the orientation and the signal of a received laser beam from another satellite. In this manner, the beam steering system may be a duplex communication system.

In one exemplary implementation, a beam steering system may be configured as a transceiver terminal that provides greater than about 20 Mbps crosslinks with independent cm-level ranging at separations of greater than 500 km for use in satellite constellations and swarms. The terminal may be a full-duplex system (e.g., a satellite able to transmit and/or receive via wavelength division multiplexing of two C-band channels at 1537 nm and 1565 nm). The beam steering system may change the direction of a transmit laser beam at a sufficiently fast rate to enable communication with multiple satellites. The liquid lens assembly in the beam steering system may include a series of staged liquid lenses combined with one or more optics (e.g., a fisheye lens) to achieve two-axis wide area coverage while retaining low divergence for narrow beamwidth communication links. The beam steering system may support broadcast, multi-cast, and multi-point-to-point free space optical communications.

In another exemplary implementation, a spacecraft includes a first laser communication transmitter to transmit a first steered laser beam from the spacecraft where the first laser communication transmitter includes a first plurality of liquid lenses to steer a first source laser beam to provide the first steered laser beam.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 4A shows a schematic of an exemplary characterization system to evaluate the performance of a beam steering system.

FIG. 4C-2 shows a perspective view of the vacuum chamber of FIG. 4C-1.

FIG. 4C-3 shows a top view of the vacuum chamber of FIG. 4C-1.

FIG. 5C shows a specification of an exemplary pressure driven liquid lens for use in the beam steering system. By applying an electric current to the shape changing lens, its optical power is controlled within milliseconds over an optical power range of −10 dpt to +10 dpt. This shape changing lens has a clear aperture of 16 mm. In order to achieve good repeatability and focus stability, the lens integrates a temperature sensor allowing for in-situ compensation of temperature effects. The lenses are therefore suited for a large variety of applications where imaging and a large beam diameter is preferable.

FIG. 7A shows a table summarizing the steering capability of the liquid lens.

DETAILED DESCRIPTION

Figure 1A:
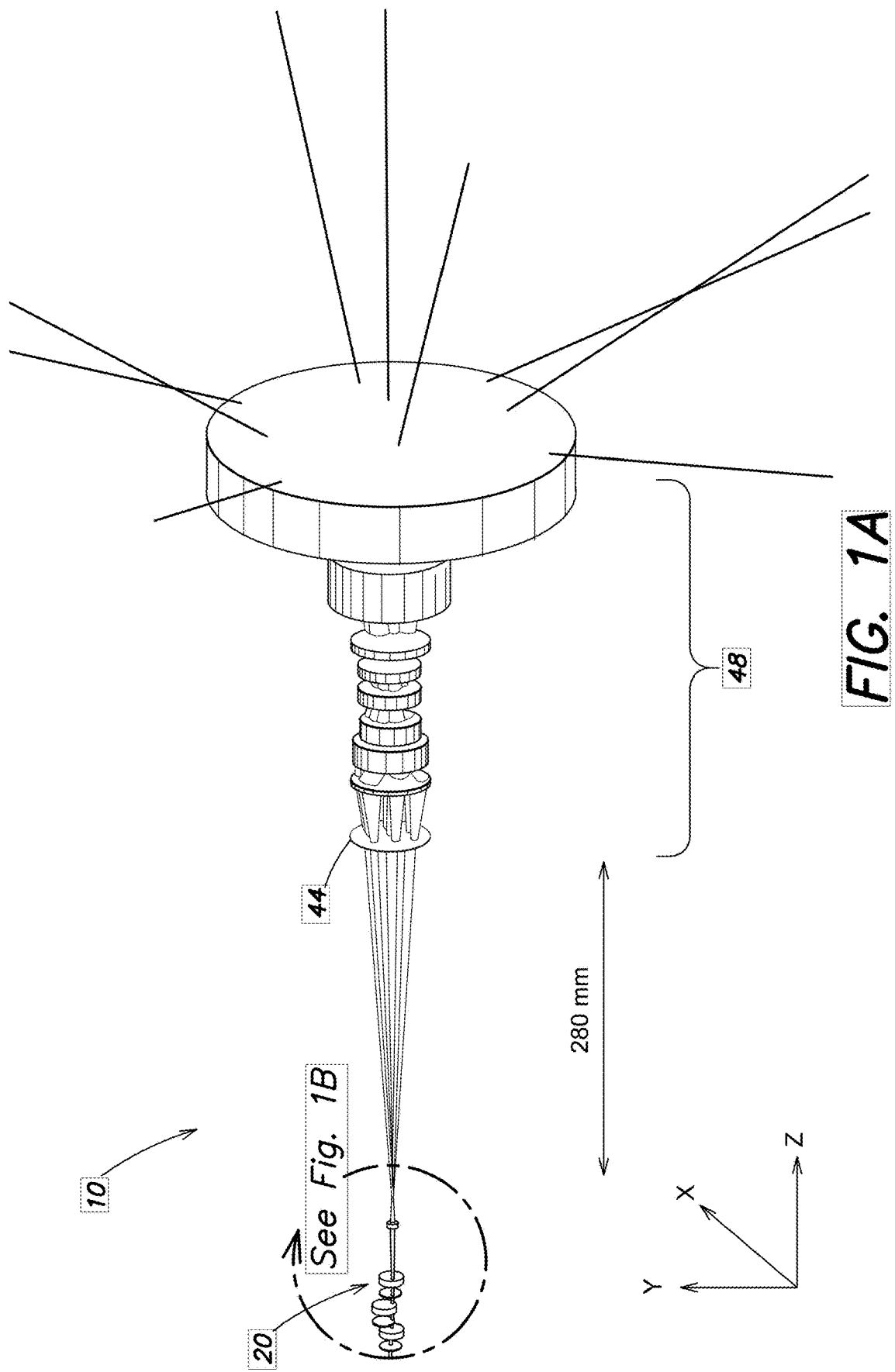
FIG. 1A shows a previously developed beam pointing device using an assembly of liquid lenses for terrestrial applications.

Following below are more detailed descriptions of various concepts related to, and implementations of, a beam steering system with one or more liquid lenses to facilitate steering of a laser beam for transmission and/or reception on a satellite or spacecraft. It should be appreciated that various concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of a beam steering system are provided, wherein a given example or set of examples showcases one or more particular features of a laser, a liquid lens assembly, an amplifying optic, a transmit detection system, and/or a reception detection system. It should be appreciated that one or more features discussed in connection with a given example of a light module and a trim may be employed in other examples of recessed lighting systems according to the present disclosure, such that the various features disclosed herein may be readily combined in a given recessed lighting system according to the present disclosure (provided that respective features are not mutually inconsistent).

A Previous Demonstration of a Liquid Lens Beam Steering System

A liquid lens is an optical element that utilizes a transparent, deformable optical fluid with a refractive index similar to conventional optics. The shape of the optical fluid may be modified thus changing the curvature of the lens and, hence, the focal length and/or divergence of the beam. The liquid lens may be actuated by an electrical input (e.g., an electric field modifies the shape of the optical fluid), thus providing an optic with an electrically controllable shape.

The shape of the optical fluid may be actuated using several approaches. For example, the optical fluid may be contained in a deformable, transparent membrane shaped as a lens. When the membrane is subjected to an external pressure force, the optical fluid and the membrane may deform in such a manner that the shape of the lens changes. In another example, the optical fluid may include multiple immiscible liquids (e.g., oil and water). The interface between the liquids may change in shape in response to modifications to the wetting properties of the respective substrates in contact with the liquids, as will be discussed in further detail below. These types of liquid lenses are known as electrowetting liquid lenses.

Liquid lens technology is typically used in terrestrial applications, such as in high-end microscopes, scanners, and other industrial-scale applications. Accordingly, optical systems that incorporate a liquid lens are typically designed for operation in ambient conditions (e.g., 1 atm, 300 K). Beam steering architectures utilizing a liquid lens have been developed in laboratory-scale environments under controlled environmental conditions.

Figure 1B:
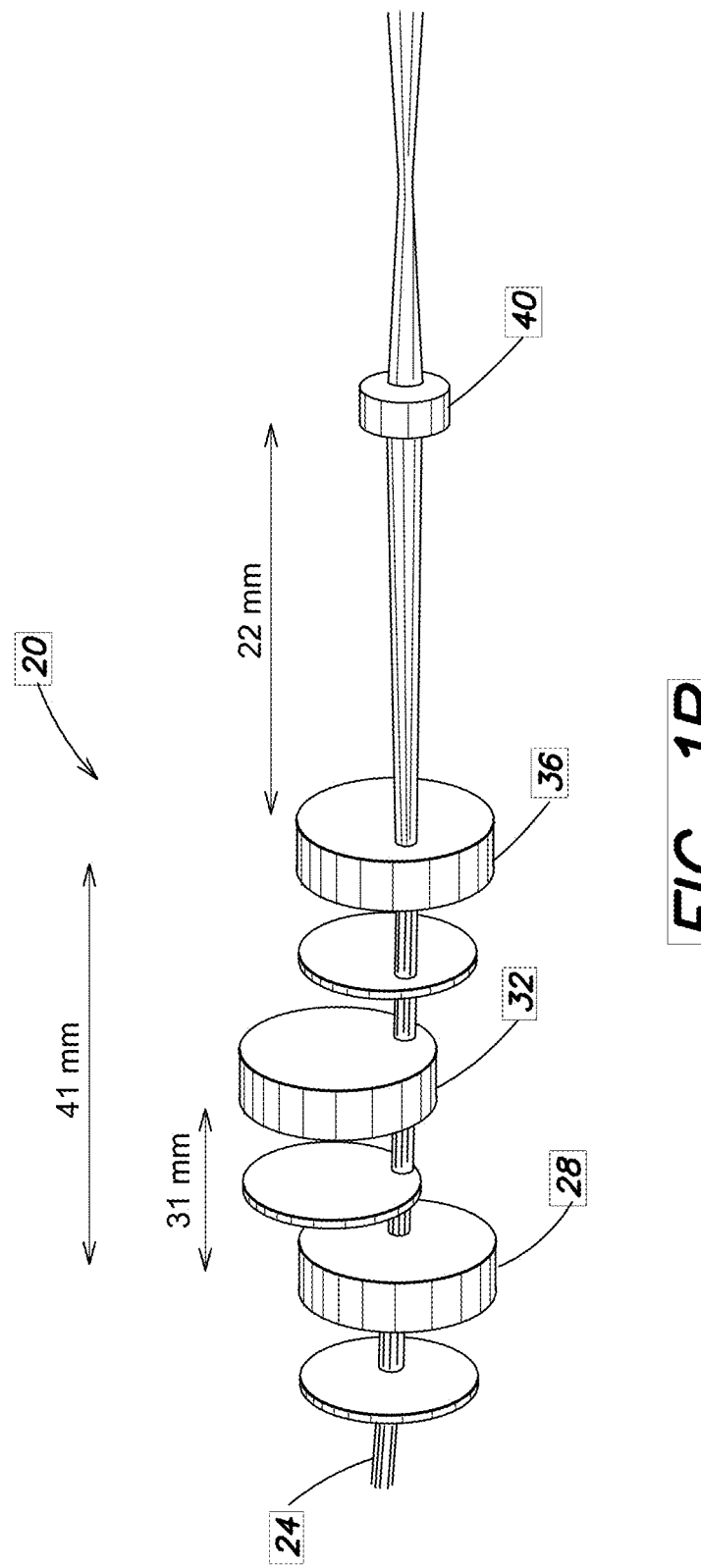
FIG. 1B shows a magnified view of the liquid lens assembly of FIG. 1A.

FIGS. 1A and 1B shows one exemplary liquid lens based beam steering system 10 by Zohrabi (Zohrabi et al., Optics Express, vol. 24, October 2016, pp. 23798-23809) for use in a scanning system in a Light Detection and Ranging (LIDAR) system. As shown, the beam steering system 10 includes a beam 24 passing through a liquid lens assembly 20. The liquid lens assembly 20 includes a first liquid lens 28 to adjust the focal length and the divergence of the beam 24. A second liquid lens 32 is offset vertically. When the shape of the second liquid lens 32 changes, the direction of the beam 24 is changed along the vertical axis. Similarly, a third liquid lens 36 is offset horizontally. When the shape of the third liquid lens 36 changes, the direction of the beam 24 is changed along the horizontal axis. The liquid lenses 28, 32, and 36 were electrically controllable via respective input voltages.

In this manner, the direction of the beam 24 is changed along two axes (i.e., the vertical axis and the horizontal axis). The liquid lens assembly 20 deflects the beam 24 by a few degrees. After passing through the liquid lens assembly 20, the beam 24 then passes through a relay lens 40, a diffuser 44, and a fisheye lens 48 to amplify the angular deflection of the beam 24, thus deflecting the beam 24 over a larger angular range. In Zohrabi, the steering system 10 was demonstrated to be capable of steering the beam 24 along two axes by +/-75 degrees by adjusting only the shape of the liquid lenses 28, 32, and 36.

As shown in FIGS. 1A and 1B, a liquid lens may be used to steer a laser beam in ambient conditions. However, the use of liquid lens technology in space applications has thus far been non-existent. Most liquids are typically volatile, resulting in evaporation especially in vacuum conditions. Additionally, liquids tend to move within their container (e.g., a sloshing motion) when subjected to microgravity conditions or to movement from the spacecraft. Thus, liquids and/or liquid containing components are generally avoided in spacecraft.

However, the liquid lens and the optical fluid contained therein may be tailored for use in a space environment. For instance, the optical fluid may be chosen to have a high molecular weight to substantially reduce or, in some instances, mitigate volatility. The housing containing the optical fluid may also sufficiently encapsulate the optical fluid such that (1) no bubbles are contained within the housing, (2) the optical fluid is sufficiently sealed from the vacuum thus preventing vaporization and/or formation of bubbles within the housing, and (3) the optical fluid is restrained from undesirable motion within the housing.

Additionally, the liquid lens may exhibit other desirable properties to facilitate operation in a space environment, such as low outgassing in vacuum conditions, resistance to ionizing radiation (i.e., radiation hardened), and thermal stability (e.g., the satellite may be subjected to large fluctuations in temperature when transitioning between the bright side and the dark side of Earth). The liquid lens may also exhibit a longer operating lifetime compared to previous steering mechanisms (e.g., MEMS devices) by virtue of reducing or, in some instances, eliminating moving parts within the beam steering system.

In the following discussion, various exemplary implementations of a beam steering system using a liquid lens is described in application to a laser communication terminal on the satellite deployed in a space environment. Compared to Zohbrani, the exemplary beam steering system described herein may be configured to provide a substantially larger range of angular deflection (e.g., up to +/-180 degrees through use of two beam steering systems). Additional components are also included (e.g., a transmit detection system, a reception detection system) to enable the beam steering system to function as a duplex system capable of transmission and reception.

An Exemplary Liquid Lens Beam Steering System for a Satellite

Figure 2A:
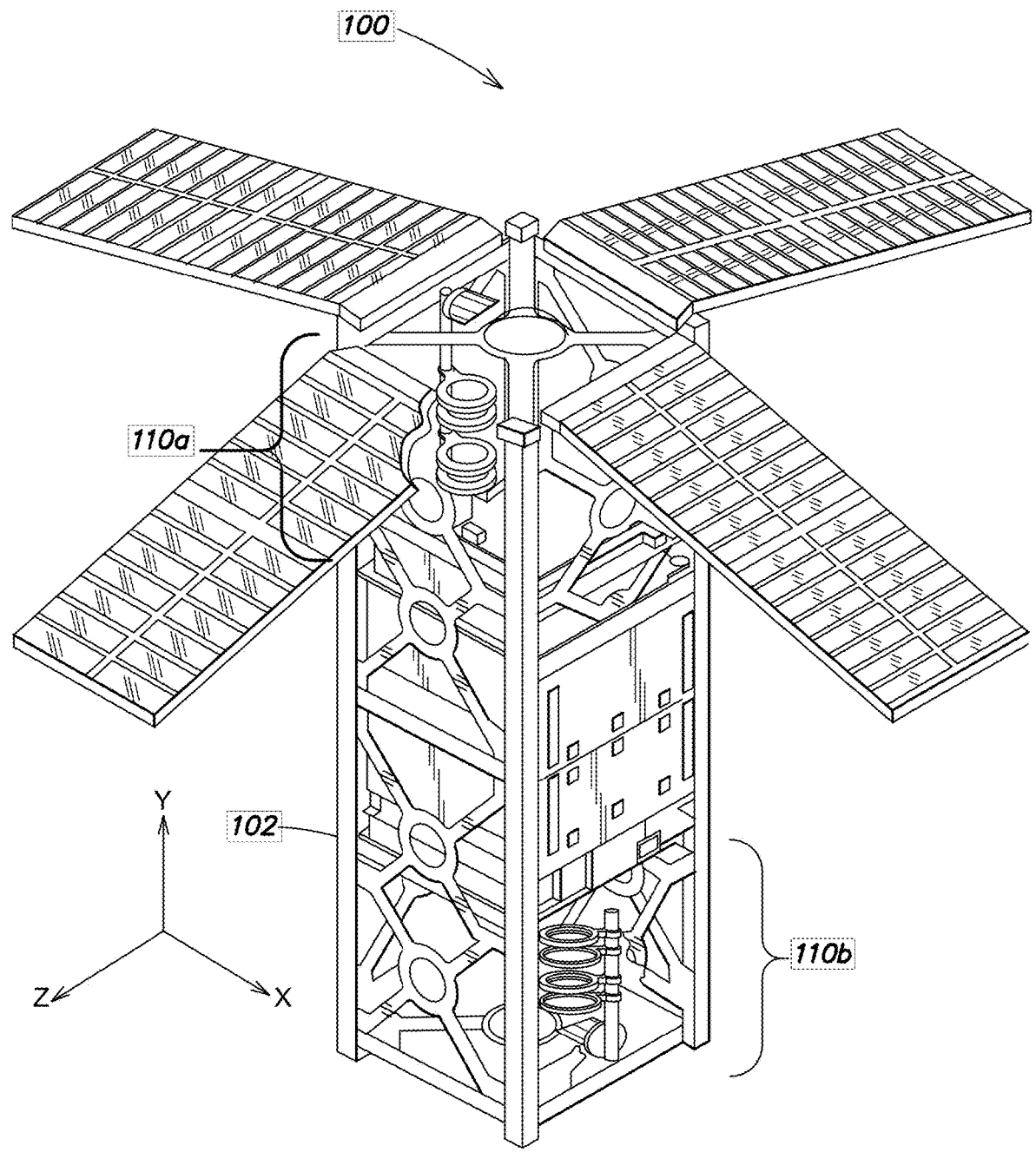
FIG. 2A shows an exemplary satellite with two beam steering systems.
Figure 2B:
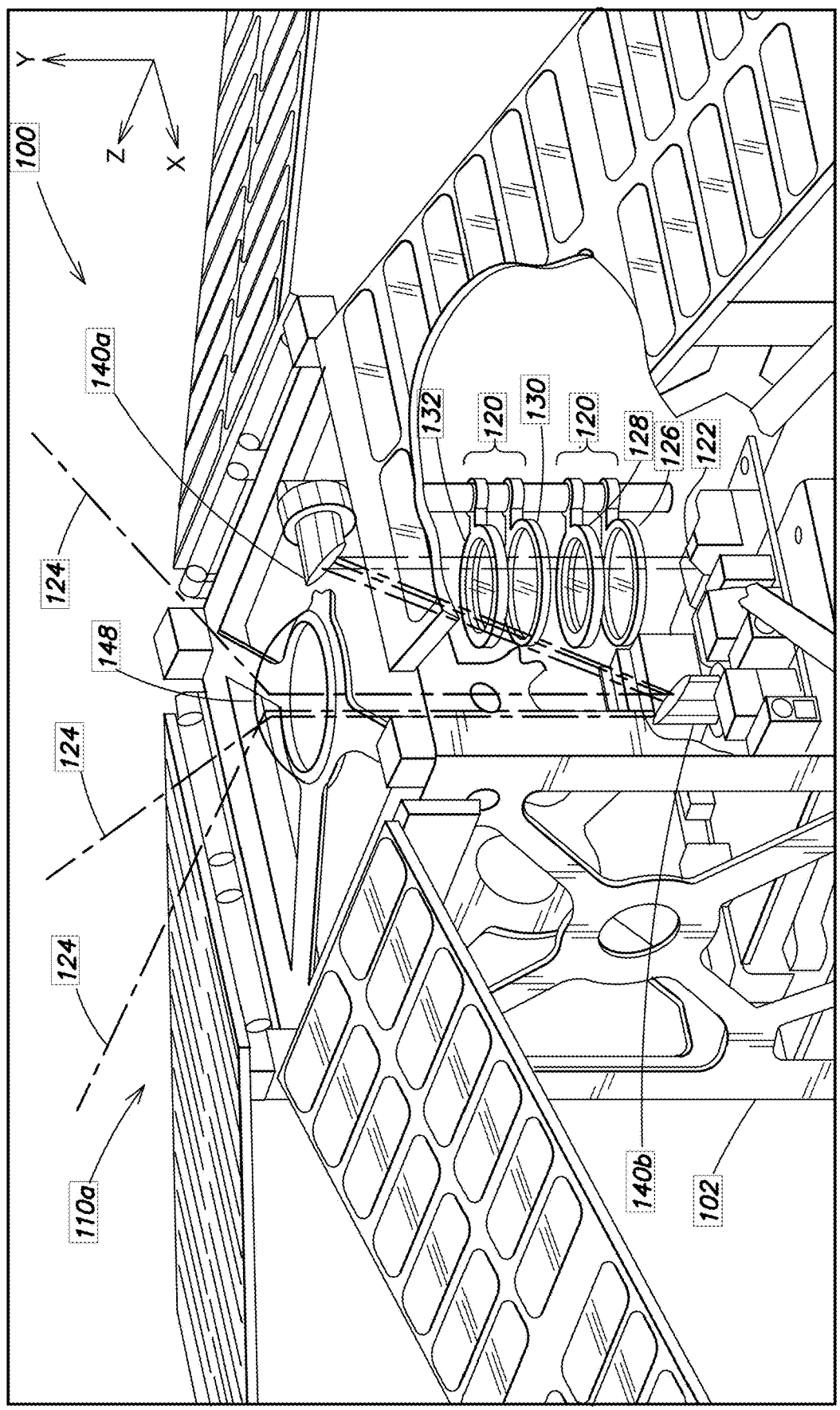
FIG. 2B shows a magnified view of one beam steering system in the satellite of FIG. 2A.

FIGS. 2A and 2B show an exemplary implementation of a satellite 100. As shown, the satellite 100 may include a frame 102 to support various components that facilitate the operation and/or mission objectives of the satellite 100. Additionally, the satellite 100 may include beam steering systems 110a and 110b to steer respective laser beams as part of corresponding laser communication systems (not shown). The satellite 100 may operate in various orbits including, but not limited to LEO, GEO, and deep space.

The satellite 100 may be various types of satellites including, but not limited to a nanosatellite (e.g., a CubeSat), a microsatellite, and a small satellite/minisatellite. The satellite 100 depicted in FIG. 2A corresponds to a 3 U CubeSat where 1 U equals to 10 cm (X) by 10 cm (Y) by 10 cm (Z). As shown in FIG. 2A, each beam steering system 110a and 110b may occupy a 1 U form factor. In some implementations, the beam steering system 110 may share space with other onboard systems, such as a power generation system (e.g., a solar panel), to further reduce the size of the satellite 100.

In some implementations, the beam steering system 110 may be used to facilitate a crosslink terminal with a data rate at least about 20 Mbps with independent cm-level ranging at distances at least about 500 km for use in constellations and swarms of satellites. The beam steering system 110 may be full-duplex (e.g., transmits and receives). In some implementations, the beam steering system 110 may also support broadcast, multi-cast and multi-point-to-point communications.

FIG. 2A shows that each beam steering system 110a and 110b may be placed at opposing ends of the frame 102 and oriented such that the beam steering systems 110a and 110b increase the overall field of view of the satellite 100. For example, the beam steering system 110a may have a +Y field of view and the beam steering system 110*b* may have a −Y field of view. Each beam steering system 110 may be configured to transmit and/or receive a laser beam within a hemisphere (e.g., 2π steradians). By placing the beam steering systems 110*a* and 110*b* on opposing ends of the frame 102, the beam steering systems 110*a* and 110*b* may together provide spherical coverage (e.g., 4π steradians) for the transmission and/or reception of a laser beam.

In this manner, the satellite 100 may transmit and/or receive signals via the laser communication system from nearly any direction relative to the satellite 100 without changing the orientation of the frame 102. This allows the satellite 100 to be oriented along a preferred direction during operation. For example, the satellite 100 may have a preferred orientation to enable various measurements (e.g., atmospheric density, atmospheric composition, atmospheric temperature, ground temperature, maintaining and uplink or downlink with a ground control station). Previous mechanical beam steering systems would typically reorient the satellite 100 to facilitate laser communication (e.g., body-pointing), thus consuming a portion of the usable operating lifetime of the satellite 100. Here, the beam steering system 110 may enable free-space laser communication between satellites while allowing the satellite 100 to remain in the preferred orientation.

In some implementations, the beam steering systems 110*a* and 110*b* may support a handoff capability where the beam steering system 110*a* may be switched to the beam steering system 110*b* while maintaining transmission to and/or reception from another satellite. For example, a satellite 100*a* may be in communication with another satellite 100*b* where the beam steering system 110*a* in satellite 100*a* is transmitting a beam towards satellite 100*b*. The relative motion between the satellites may be such that satellite 100*b* crosses from the +Y field of view to the −Y field of view of satellite 100*a*. As this transition occurs, satellite 100*a* may switch from beam steering 110*a* to beam steering 110*b* to maintain transmission of the laser beam to satellite 100*b*.

FIG. 2B shows a magnified view of the beam steering system 110*a* in the satellite 100. As shown, the beam steering system 110*a* may include a laser 122 that emits a laser beam 124. The laser beam 124 may pass through a liquid lens assembly 120, which includes at least one liquid lens to deflect the laser beam 124. For instance, FIG. 2B shows the liquid lens assembly 120 having a liquid lens 128 and 132 to adjust the focal length and the deflection angle along a first axis, respectively. The liquid lens assembly 120 may also include additional optics 126 and 130 to further manipulate the shape, divergence, and/or spectral properties of the laser beam 124. After passing through the liquid lens assembly 120, the laser beam 124 may be directed towards an amplifying optic 148, which amplifies the angular deflection of the laser beam 124 by the liquid lens assembly 120, thus increasing the range over which the laser beam 124 may be transmitted (e.g., a hemisphere).

In this manner, the spacecraft does not have to include a gimbal or a mechanical actuator to steer the laser beam 124. For reference, the laser beam 124 is referred to as the "source laser beam" after emission by the laser 122 and the "steered laser beam" after pass through the liquid lens assembly 120 and/or the amplifying optic 148.

Generally, the preferred optical path length between the liquid lens assembly 120 and the amplifying optic 148 depends on the properties of the optics used in the liquid lens assembly 120 and the amplifying optic 148. In some implementations, the optical path may be longer than the frame 102 supporting the beam steering system 110. To accommodate the size constraints imposed by the form factor of the satellite 100, additional optics may be introduced between the liquid lens assembly 120 and the amplifying optic 148 to increase the optical path while keeping the beam steering system 110 within the specified size constraints. For example, FIG. 2B shows mirrors 140*a* and 140*b* may be used to reflect the laser beam 124, thus folding the optical path. This configuration may be used to increase the optical path length between the liquid lens assembly 120 and an amplifying optic 148 while keeping the beam steering system 110 within a 1 U form factor.

The laser 122 may be part of the laser communication system (not shown), which may include electronics to control the signal and/or data in the laser beam 124. For example, the laser 122 may be configured to emit the laser beam 124 as a series of pulses corresponding to the desired signal and/or data to be transmitted. The laser 122 may also more generally represent multiple light sources in the laser communication system. For instance, the laser communication system may emit light at multiple wavelengths corresponding to various spectral ranges including, but not limited to visible, near-infrared, short-wavelength infrared, mid-wavelength infrared, and long-wavelength infrared bands. In some implementations, the laser 122 may emit light corresponding to standard telecommunication and/or optical communication channels, such as C-band channels at wavelengths of 1537 nm and 1565 nm.

The laser 122 may thus emit multiple laser beams 124 through the beam steering system 110. The multiple laser beams 124 may be collocated with one another for at least a portion of the beam steering system 110 resulting in propagation along a substantially similar optical path through the liquid lens assembly 120 and/or the amplifying optic 148. The multiple laser beams 124 may also be spatially offset from one another such that at least one laser beam 124 propagates along a different optical path through the liquid lens assembly 120 from another laser beam 124. This may cause the liquid lens assembly 120 to deflect the laser beams 124 differently, resulting in the laser beams 124 being outputted from the beam steering system 110 at different solid angles. For example, FIG. 2B shows three laser beams 124 that are offset from one another such that they exit the amplifying optic 148 along three different directions.

The liquid lens assembly 120 is used to steer the laser beam 124. The liquid lens assembly 120 may include multiple liquid lenses that are each electrically controllable. For example, the liquid lens assembly 120 may include a first liquid lens 128, a second liquid lens 132, and a third liquid lens 136 arranged in a serial configuration. The first liquid lens 128 may be centered with the laser beam 124 and may thus be used to adjust the focal length and/or the beamwidth of the laser beam 124. For example, the focal length may be adjusted based on the distance between the satellite 100 and another satellite to ensure the laser beam 124 is focused at a detector on the other satellite. The second liquid lens 132 may be offset along a first axis (e.g., a X axis) with respect to the optical axis of the first liquid lens 128 and may thus be used to change the direction of the laser beam 124 along the X axis. The third liquid lens 136 may be offset along a second axis (e.g., a Y axis orthogonal to the X axis) with respect to the optical axis of the first liquid lens 128 and may thus be used to change the direction of the laser beam 124 along the Y axis.

The liquid lens 128, 132, and 136 may have an adjustable focal length that ranges between about 5 cm to infinity (i.e., the liquid lens is flat). In some implementations, the liquid lens 128, 132, and 136 may vary in size, e.g., having a clear aperture ranging between about 1 mm to about 20 mm. For example, the liquid lenses 132 and 136 may have a larger aperture than the liquid lens 128 to allow the lenses 132 and 136 to be positioned with a larger offset from the optical axis of the liquid lens 128. A larger offset may enable a larger steering range of the laser beam 124 using only the liquid lens assembly 120. The liquid lens 128, 132, and 136 may be configured to transmit light within a wavelength range corresponding to the laser 122. The liquid lens 128, 132, and 136 may have various shapes including, but not limited to spherical, aspheric, and cylindrical. The shape of the optical fluid may also be convex and/or concave. Exemplary liquid lenses 128, 132, and 136 may include a Corning Varioptic A-39N electrowetting liquid lens or an Optotune SY-EL-16-40-TC-VIS-20D pressure drive liquid lens.

In some implementations, the liquid lens 128, 132, and 136 may be configured to operate over a large temperature range corresponding to the sunlit phase of an orbit (e.g., thermal radiation emitted by the Sun, albedo from the Earth, thermal radiation emitted by the Earth) and the eclipse phase of an orbit (e.g., thermal radiation emitted by the Earth). For example, in LEO, the temperature of the satellite may range between about −170° C. to about 125° C. For larger orbits, the temperature may be shifted to lower or higher temperatures and may span a larger range. The liquid lens 128, 132, and 136 may also be configured to operate in a vacuum environment. The level of vacuum may vary based on the orbit of the satellite 100. For example, in LEO, the pressure may be about $10^{-7}$ Torr. The pressure may increase or decrease at larger or smaller orbits, respectively. This may be accomplished, in part, by using vacuum-rated components (e.g., components that exhibit little to no outgassing at the desired vacuum level). The liquid lens 128, 132, and 136 may also be resistant to ionizing radiation (e.g., high energy photons emitted by the Sun). For example, the liquid lens 128, 132, and 136 may be coated with an absorptive or reflective filter that prevents ionizing radiation from interacting with the optical fluid.

It should be appreciated the liquid lens 128, 132, and 136 are electrically operated using various electronics (e.g., a driver, a controller) that are not shown in FIGS. 2A and 2B. These electronics may also be configured to meet the same thermal, radiation, and vacuum specifications as the liquid lens 128, 132, and 136. For instance, the electronics may be thermally regulated, radiation hardened, and designed for operation in high vacuum environments using well-established techniques.

The arrangement of the liquid lens 128, 132, and 136 in the liquid lens assembly 120 may vary depending on several factors including, but not limited to the operating focal length range of each liquid lens (the operating focal length range may be smaller than the actual focal length range described above), space constraints imposed by the structure of the satellite 100, and the properties of the amplifying optic 148 (e.g., curvature, aperture size). For instance, the liquid lens 128, 132, and 136 and the amplifying optic 148 may be arranged such that the laser beam 124 is steerable along two orthogonal axes (e.g., X and Y axes, vertical and horizontal axes) at angles ranging between about −90 degrees and about +90 degrees (e.g., a hemisphere) along each axis where 0 degrees corresponds to an optical axis of the amplifying optic 148.

In some implementations, the liquid lenses 132 and 136 may be offset from the optical axis of the liquid lens 128 along a first axis and a second axis, respectively, where the first axis, the second axis, and the optical axis are orthogonal. In some cases, the arrangement of the liquid lenses 132 and 136 may cause the laser beam 124 to strike the liquid lens 136 at a location that is not coincident with the second axis of the liquid lens 136 when the laser beam 124 is deflected along the first axis of the liquid lens 132. This may cause the liquid lens 136 to deflect the laser beam 124 along both the second axis and a first axis of the liquid lens 136 parallel to the first axis of the liquid lens 132.

In some implementations, it may be desirable for the liquid lens 132 to deflect the laser beam 124 primarily along the first axis and the liquid lens 136 to deflect the laser beam 124 primarily along the second axis, in part, to increase the range of angular deflection. This may be accomplished, in part, by choosing an appropriate spacing between consecutive liquid lenses in the liquid lens assembly 120 and the offset of the liquid lenses 132 and 136 from the optical axis of the liquid lens 128. For example, the liquid lens 132 may have a sufficiently long focal length and the distance between the lenses 132 and 136 may be sufficiently small. In this manner, the change in position of the laser beam 124 on the liquid lens 136 may remain substantially proximate to the second axis of the liquid lens 136 even if the laser beam 124 is deflected along the first axis of the liquid lens 132. In some implementations, the liquid lenses 132 and 136 may instead be cylindrical in shape and oriented such that the curvature of the liquid lens 132 is orthogonal to the curvature of the liquid lens 136.

In some implementations, the liquid lens assembly 120 may include additional optical components to modify the shape of the laser beam 124 and/or to change the steering performance. For example, a collimating lens (e.g., optic 130) may be placed between the liquid lens 128 and 132 to collimate the laser beam 124 before being deflected by the liquid lenses 132 and 136. In another example, an optic may also be placed between the liquid lenses 132 and 136 to adjust the trajectory of the laser beam 124 (e.g., to position the laser beam 124 onto the second axis of the liquid lens 136 without affecting the direction of the laser beam 124 along the first axis of the liquid lens 132). In yet another example, an optic (e.g., optic 126) may be placed before the liquid lens 128 in order to adjust the shape of the laser beam 124 emitted by the laser 122 prior to entering the liquid lens assembly 120 (e.g., collimating the laser beam 124). In some implementations, filters may also be disposed within the liquid lens assembly 120 to reduce and/or remove unwanted light in the liquid lens assembly 120, such as stray light from external sources (e.g., the Sun, the albedo of the Earth). In some implementations, bandpass filters may be used to restrict the light propagating through the liquid lens assembly 120 to the operating wavelengths of the laser beam 124.

In some implementations, the optics within the liquid lens assembly 120 may be mounted directly to the frame 102 at fixed positions corresponding to a desired arrangement. In some implementations, the mounting mechanism supporting the liquid lens assembly 120 may allow some adjustability in the positioning of the liquid lenses 128, 132, and 136 and the optics 126 and 130. For example, FIG. 2B shows the optics may be mounted onto a rail via respective ring clamps. The position of the optics may thus be adjusted and secured along an axis substantially parallel to the optical path of the laser beam 124.

The amplifying optic 148 is used to amplify the change in direction of the laser beam 124 after passing through the liquid lens assembly 120. In one example, the liquid lens assembly 120 may change the angle of the laser beam 120 along a particular axis up to about 5 degrees. The amplifying optic 148 may increase this change in angle to about 90 degrees as the laser beam 124 exits the satellite 100. This may be accomplished, in part, by changing the position where the laser beam 124 strikes the amplifying optic 148 using the liquid lens assembly 120. For instance, if the laser beam 124 strikes the center of the amplifying optic 148, the trajectory of the laser beam 124 may remain substantially unchanged. In contrast, if the laser beam 124 strikes the edge of the amplifying optic 148, the trajectory of the laser beam 124 may be refracted to a wider angle.

The amplifying optic 148 may be various types of wide angle optics including, but not limited to a fisheye lens and a rectilinear wide angle lens. In some implementations, the amplifying optic 148 may represent an arrangement of several optical components. For example, the amplifying optic 148 may include a relay lens, a diffuser lens, and a fisheye lens arranged in series to provide the desired amplification of the laser beam 124.

It should be appreciated the beam steering system 110 may also be used to receive a laser beam from another satellite, thus making the laser communication system a duplex system capable of transmitting and receiving signals. The received laser beam may enter through the amplifying optic 148 and propagate along an optical path similar to the laser beam 124. Thus, the beam steering system 110 may receive a laser beam along the same angular space that the laser beam 124 may be transmitted (e.g., a hemisphere).

The received laser beam may also be steered by the liquid lens assembly 120. In some implementations, the received laser beam may be steered in order to direct the beam towards a desired detector in the laser communication system (e.g., multiple detectors may be used with different operating wavelength ranges). In some implementations, the liquid lens assembly 120 may configure the beam steering system 110 to receive a laser beam from a particular direction. For example, the satellite 100 may be in communication with multiple satellites. In order to discriminate received signals from the multiple satellites, the beam steering system 110 may steer each received laser beam to a corresponding detector. In some implementations, the beam steering system 110 may also be used to search for another satellite by using the liquid lens assembly 120 to sweep the angular space (e.g., the hemisphere) of the beam steering system 110 for a signal from another satellite.

It should also be appreciated that the responsivity of the beam steering system 110 may vary depending on several factors including, but not limited to environmental factors, disturbances, and slew rates for representative applications in LEO, GEO, and deep space. In some implementations, the laser beams received by the beam steering system may be coupled to an optical fiber for preamplification using electro-optic or MEMS beam steering technology in order to enable higher data rates with lower power and/or lower gain systems.

As described above, the laser communication system may transmit multiple laser beams 124 and/or receive multiple laser beams from another satellite. This may enable the satellite 100 to communicate with multiple satellites in a substantially simultaneous manner. For instance, the beam steering system 110 may be configured to support up to about ten different users (e.g., another satellite).

As described above, at least one of the liquid lenses in the liquid lens assembly 120 may be used to adjust the focal length and, hence, the spot size of the laser beam 124. The ability to adjust the spot size of the laser beam 124 at a particular distance from the satellite 100 may enable multiple modes of operation. For example, a first mode of operation may correspond to the laser beam 124 having a narrow beamwidth and a low divergence (i.e., the laser beam 124 has a small spot size and is substantially collimated). This mode may be used to provide high data rates when communicating with other satellites. A second mode of operation may correspond to the laser beam 124 having a wide beamwidth. This mode may enable the satellite 100 to operate as a beacon to facilitate pointing, acquisition, and/or tracking of other satellites.

Figure 3A:
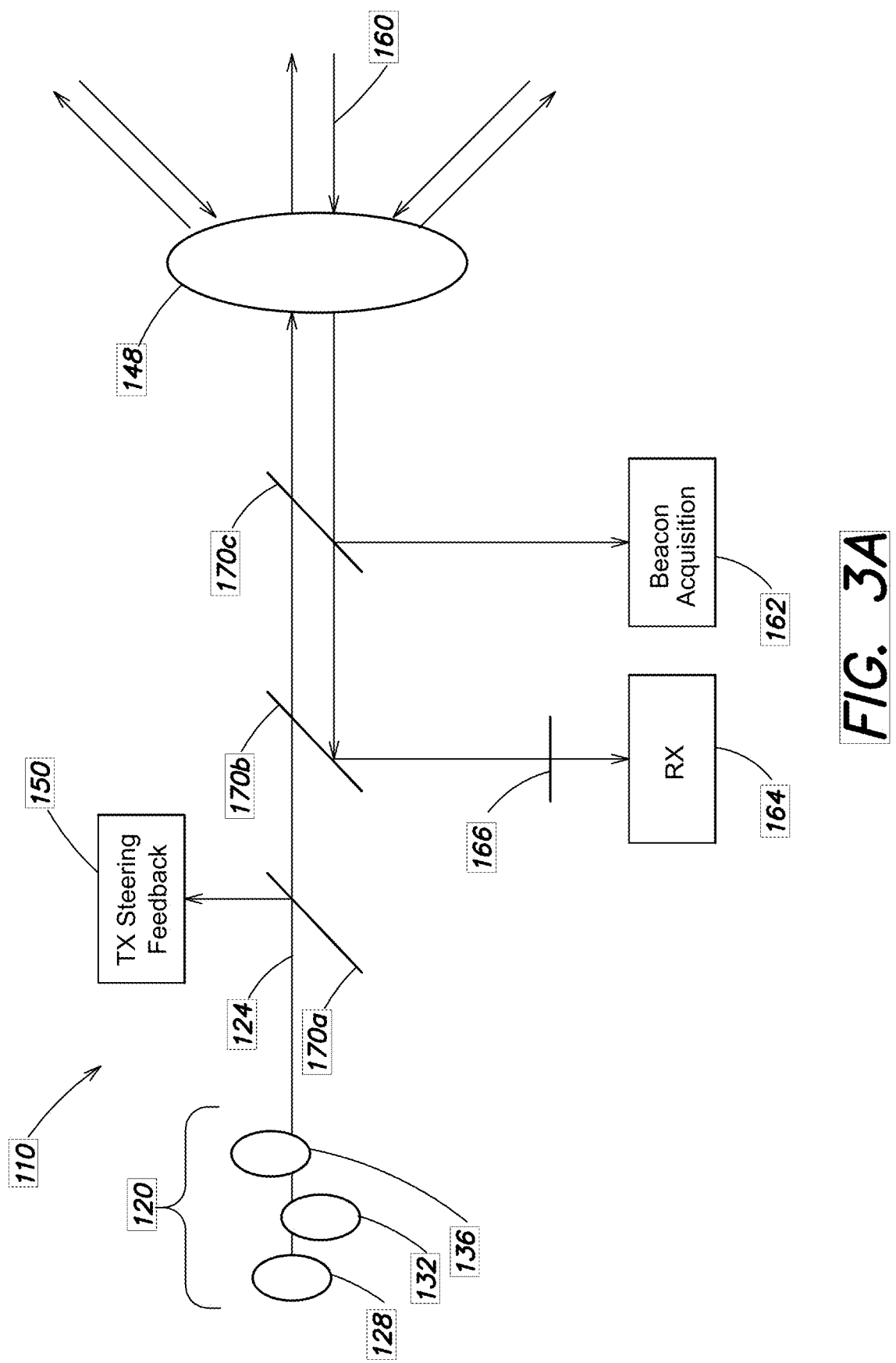
FIG. 3A shows a schematic of an exemplary beam steering system for use in a satellite.

The beam steering system 110 may also include monitoring and feedback systems to track the orientation and the signal of the laser beam 124 and/or a received laser beam. FIG. 3A shows a schematic of an exemplary beam steering system 110. As shown, the beam steering system 110 may include a transmit detection system comprising a transmit feedback system 150 to monitor the direction of the laser beam 124 emitted by the laser 122. The beam steering system 110 may also include a reception detection system comprising a reception feedback system 164 and reception signal system 162 to measure the direction and signal, respectively, of a received laser beam 160.

As shown, the transmitted laser beam 124 and the received laser beam 160 may exit and enter the beam steering system 110, respectively, along substantially similar optical paths albeit in opposite directions. Additionally, the transmitted laser beam 124 and the received laser beam 160 may have optical paths that partially overlap within the beam steering system 110. In order to separately measure the transmitted laser beam 124 and the received laser beam 160, the beam steering system 110 may include one or more splitting elements. For example, FIG. 3A shows a splitting element 170*a* may be a beam splitter used to divide the laser beam 124 such that a small portion of the laser beam 124 is directed towards the transmit feedback system 150 for measurement.

The beam steering system 110 may also include splitting elements 170*b* and 170*c* to direct a portion of the received laser beam 160 to the reception feedback system 164 and the reception signal system 162, respectively, preferably without disrupting the laser beam 124. In cases where the laser beam 124 and 160 are at different wavelengths, the splitting elements 170*b* and 170*c* may be a dichroic mirror and a dichroic beam splitter, respectively. As shown, the splitting elements 170*b* and 170*c* may be configured to substantially transmit the laser beam 124. For the laser beam 160, however, the splitting element 170*c* may divide the laser beam 160 such that a portion of the laser beam 160 is directed to the reception signal system 162. The remaining portion of the laser beam 160 may be reflected by the splitting element 170*b* to the reaction feedback system 164. Although the laser beams 124 and 160 are depicted in FIG. 3A as following separate optical paths, it should be appreciated the laser beams 124 and 160 may also be collocated along at least a portion of their respective optical paths while still being separable via the splitting elements 170*b* and 170*c*.

Figure 3B:
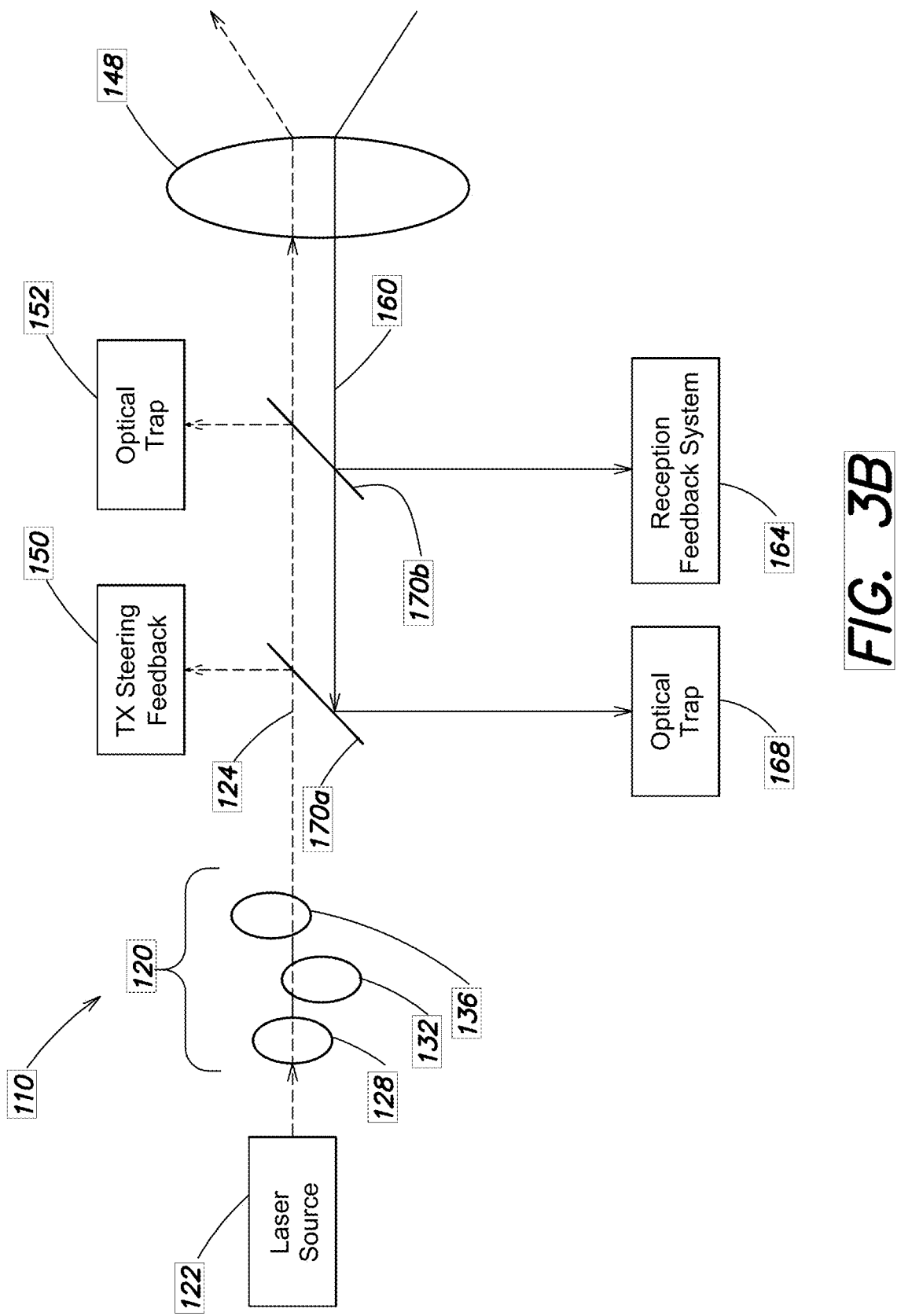
FIG. 3B shows a schematic of another exemplary beam steering system for use in a satellite.

In some implementations, the beam steering system 110 may support laser beams 124 and 160 at the same wavelength, in which case the splitting elements 170*a*, 170*b*, and 170*c* may be beam splitters. In such cases, the splitting elements in the beam steering system 110 may still be used to distinguish between the laser beams 124 and 160. For example, FIG. 3B shows an exemplary beam steering system 110 configured to separately measure the laser beams 124 and 160 via splitting elements 170*a* and 170*b*. As shown, the splitting elements 170*a* and 170*b* may each be a beam splitter. The splitting element 170*a* may divide the laser beam 124 such that a portion of the beam 124 is directed to the transmit feedback system 150 for measurement. The splitting element 170b may also divide the laser beam 124 by virtue of splitting the laser beam 160. A portion of the laser beam 124 may be directed to an optical trap 152 to avoid interference within the beam steering system 110.

The splitting element 170b may similarly divide the laser beam 160 such that a portion of the beam 160 is directed to a reception feedback system 164. The splitting element 170a may reflect a portion of the beam 160 to an optical trap 168. The remaining portion of the beam 160 may be transmitted through the splitting element 170a. To prevent this portion of the beam 160 from interfering with the laser beam 124, an optical isolator (not shown) may be placed between the liquid lens assembly 120 and the splitting element 170a such that the laser beam 124 transmits through the optical isolator and the laser beam 160 is absorbed by the optical isolator.

In some implementations, the laser beams 124 and 160 may be polarized with different polarizations (e.g., beam 124 has a s polarization and beam 160 has a p polarization, beam 124 has a clockwise circular polarization and beam 160 has a counterclockwise circular polarization). In such cases, at least one of the splitting elements may be a polarizing beam splitter configured to transmit one polarization while reflecting the other polarization. For example, a polarizing beam splitter may transmit the laser beam 124 towards the amplifying optic 148 while reflecting the laser beam 160 towards the reception feedback system 164 (and/or the reception signal system 162). In this manner, the optical paths of the laser beams 124 and 160 may be separated in the beam steering system 110 after being collocated through the amplifying optic 148.

The transmit detection system is used to monitor the transmitted laser beam 124. In some implementations, the transmit detection system may include a transmit feedback system 150 to monitor the direction of the laser beam 124. For example, the transmit feedback system 150 may be a position sensing device (e.g., a camera, a position sensing detector) that can determine the orientation of the beam 124 after passing through the liquid lens assembly 120 based on the position the beam 124 strikes the detector in the transmit feedback system 150. The position on the detector of the transmit feedback system 150 may be correlated to the output angle of the beam 124 after exiting the satellite 100 through the amplifying optic 148. Thus, the transmit feedback system 150 may be coupled with the liquid lens assembly 120 to form a closed loop to maintain a desired orientation during operation of the beam steering system 110. In some implementations, the transmit feedback system 150 may be configured to track multiple laser spots corresponding to multiple laser beams 124 and determine the output angle of each laser beam 124 used in the beam steering system 110. For example, multiple spots may be resolved by a camera.

The transmit detection system may also include a transmit signal system (not shown) to measure the signal in the laser beam 124. For example, the transmit signal system may include a photodiode that absorbs a portion of the laser beam 124 to produce an electrical signal. The transmit signal system may also be used to provide feedback to the beam steering system 110 and, more broadly, the laser communication system to ensure the desired signal being transmitted is maintained. In some implementations, the transmit feedback system 150 and the transmit signal system may be merged into a single measurement device.

The reception detection system is used to detect and read signals from a laser beam 160 originating from another satellite. As with the transmit detection system, the reception detection system may also include a reception feedback system 164 and a reception signal system 162 to monitor the orientation and signal of the laser beam 160, respectively. In some implementations, the reception feedback system 164 may also be configured to track multiple laser beams 160 received by the satellite 100. In some implementations, a MEMS shutter array 166 may be used in conjunction with the reception feedback system 164 as an adjustable iris to block noise (e.g., parasitic light) to the reception feedback system 164 from portions of the beam steering system's 110 field of view that are not being used for communication (e.g., portions of the hemisphere where the laser 160 is not being received).

Characterization of an Exemplary Beam Steering System

As an initial demonstration of the beam steering system described herein, a characterization setup was devised to measure the steering performance of an exemplary beam steering system under vacuum conditions. These measurements are used, in part, to assess the performance of a commercial liquid lens operating under vacuum.

FIG. 4A shows an exemplary characterization system 180 to characterize a beam steering system 110. As shown, the beam steering system 110 includes a laser 122 that emits a laser beam 124 and a liquid lens assembly 120 comprising a first liquid lens 128 and a second liquid lens 132. The laser 122 may emit the laser beam 124 at a wavelength of 635 nm. The first liquid lens 128 may be used to adjust the focus of the beam 124. The second liquid lens 132 may be used to deflect the laser beam 124 along a first axis. For testing purposes, the liquid lens assembly 120 in FIG. 4A is thus configured to provide one-dimensional steering of the laser beam 124. The liquid lenses 128 and 132 may be supported by drivers 127 and 131, respectively, which provide electrical inputs (e.g., a voltage) to adjust the focal length of each respective liquid lens.

The characterization system 180 may include a camera 182 to characterize the laser beam 124. In one example, the camera 182 may be a mvBlueFox-IGC camera that collects data on the beam steering angle while also providing control feedback to monitor and reduce the spot size of the laser beam 124 on the detector of the camera 182. The camera 182 may be placed at the end of the staged liquid lens assembly 120 in order for the refracted light to strike the detector of the camera 182. The spot size of the laser beam 124 may be controlled by adjusting the voltage applied to the liquid lens 128 (i.e., the on-axis liquid lens). The location of the spot on the camera 182 provides data on the beam steering angle and the spot size provides data on the beam divergence. It should be appreciated the camera 182 may, in some implementations, represent the detector used in a transmit feedback system 150 to track the steering angle of the laser beam 124.

The characterization system 180 may also include a processor 184 to control and receive data from the liquid lens assembly 120 (via the drivers 127 and 131) and the camera 182. In one example, the processor 184 may be a Raspberry Pi v3. Depending on the type of liquid lens used, the electrical inputs may vary. For example, a liquid lens that adjusts the curvature of the optical fluid via changes to the wettability of a support substrate (e.g., an electrowetting liquid lens) may receive as an input a voltage via a pulse width modulation (PWM) controller. In another example, a liquid lens that adjusts curvature of the optical fluid based on changes to a supporting membrane (e.g., a pressure driven liquid lens) may have a current applied to a voice coil that pushes on the membrane, thus changing the curvature.

The processor 184 may be controlled by software 186, which may include processes for electrical input 188 to control the liquid lens assembly 120 and processes for image processing 190 for data acquired by the camera 182. For example, electrical input 188 may provide controls to set the input voltage and/or current applied to each liquid lens 128 and 132. The imaging processing 190 may analyze images captured by the camera 182, such as determining a centroid of the laser spot on the camera detector. In some implementations, the electrical input 188 and the image processing 190 may be coupled to form a closed feedback loop where the spot size of the laser beam 124 is used to adjust the electrical inputs to the liquid lens assembly 120 in order to set and maintain a desired beam spot size, divergence, and deflection angle. The laser 122 may also be coupled to the processor 184 to set the laser 122 on or off and/or the laser power.

Figure 4B:
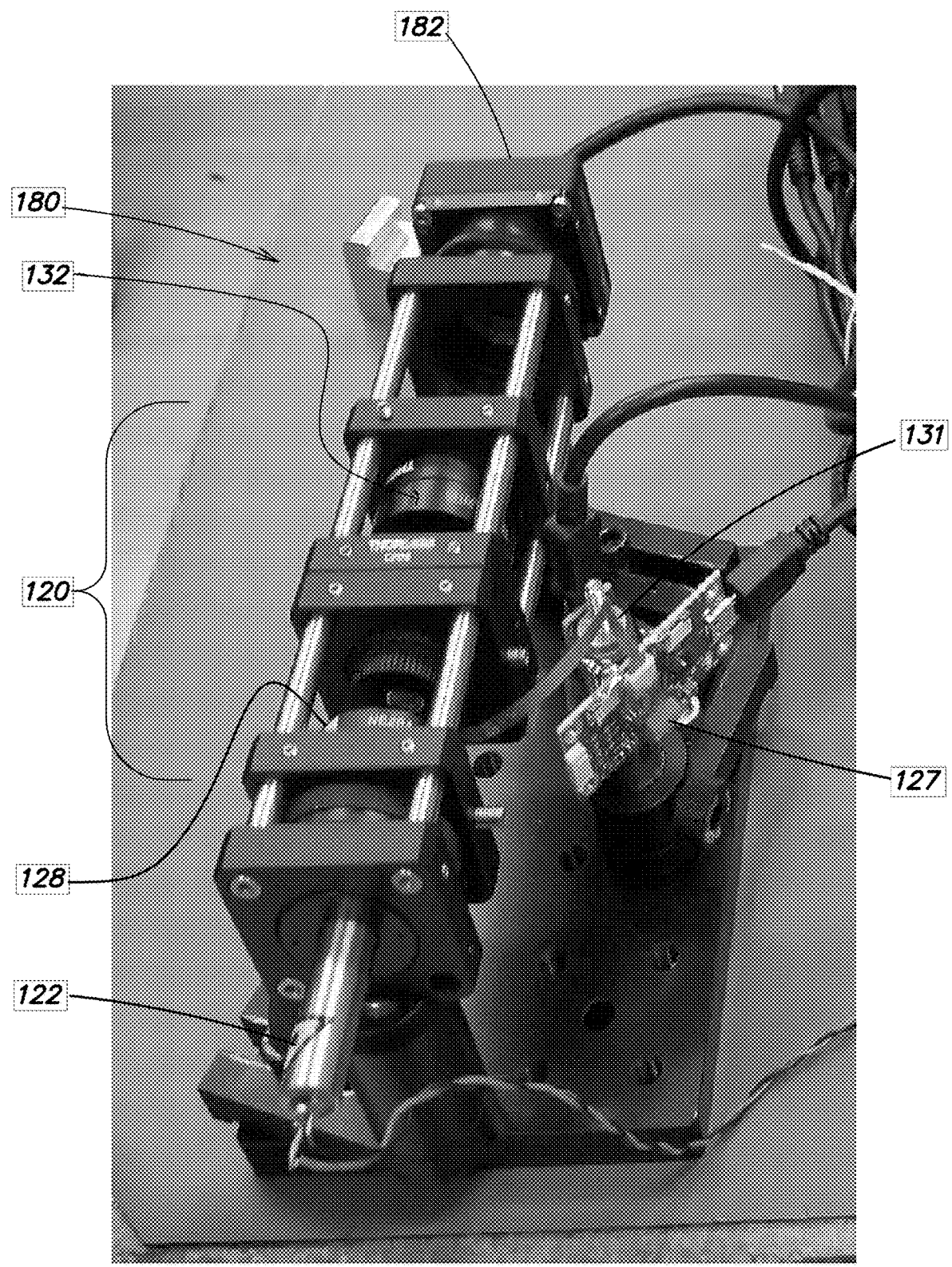
FIG. 4B shows an image of the characterization system based on FIG. 4A.

FIG. 4B shows an image of an exemplary characterization system 180. As shown, the laser 122, the liquid lens assembly 120, and the camera 182 may be mounted onto an optical bread board and aligned via an optical cage system. As shown, the liquid lenses 128 and 132 may be electrically coupled to drivers 127 and 131, respectively, via a flexible cable. The drivers 127 and 131 may be electrically coupled to the processor 184 (not shown) via universal serial bus (USB) cables.

Figures 1, 4C:
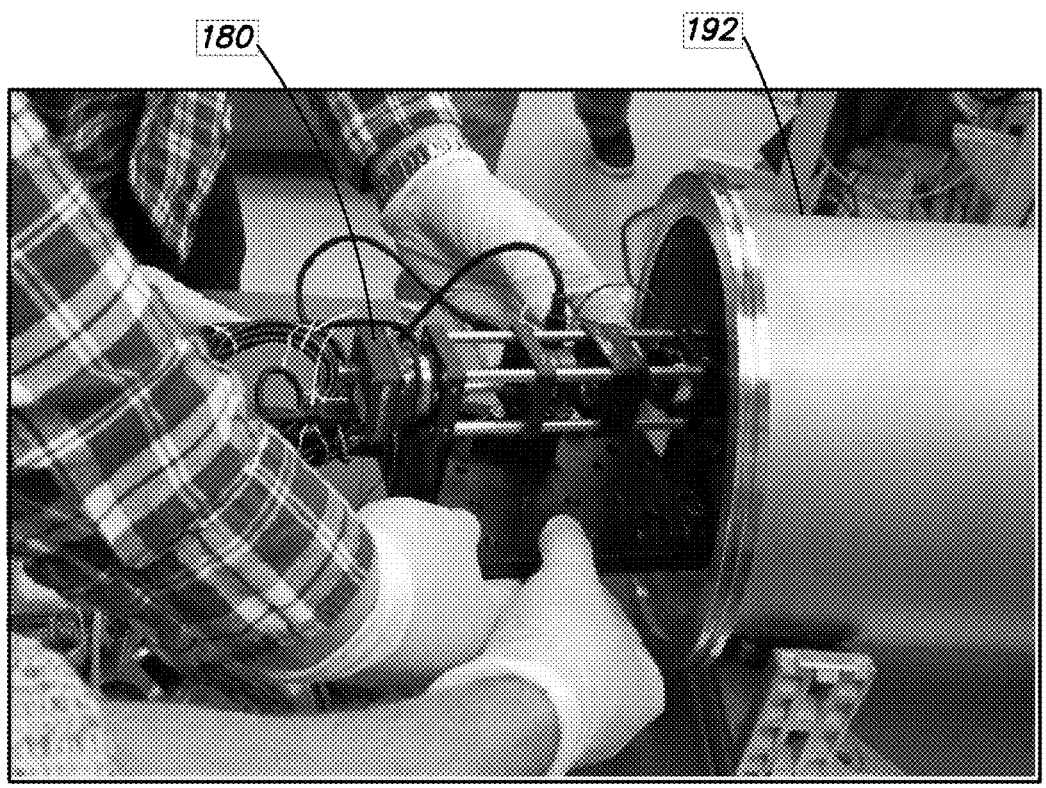
FIG. 4C-1 shows an exemplary vacuum chamber used to create a vacuum environment for the characterization system.
Figures 2, 4C:
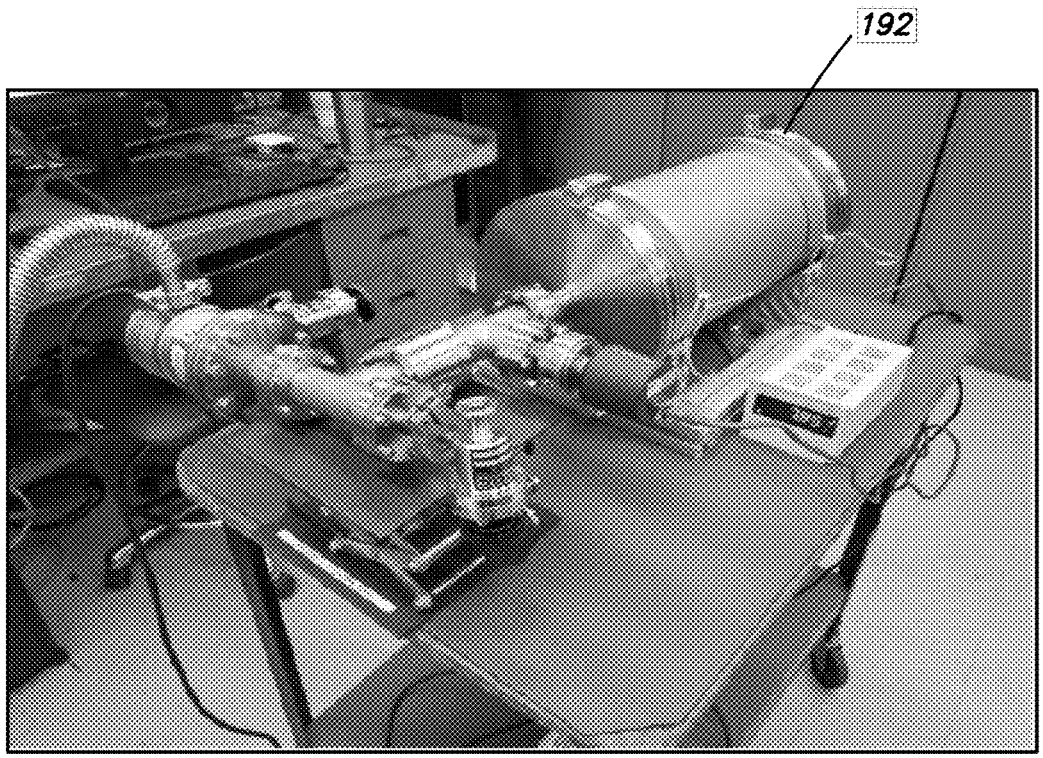
Figures 3, 4C:
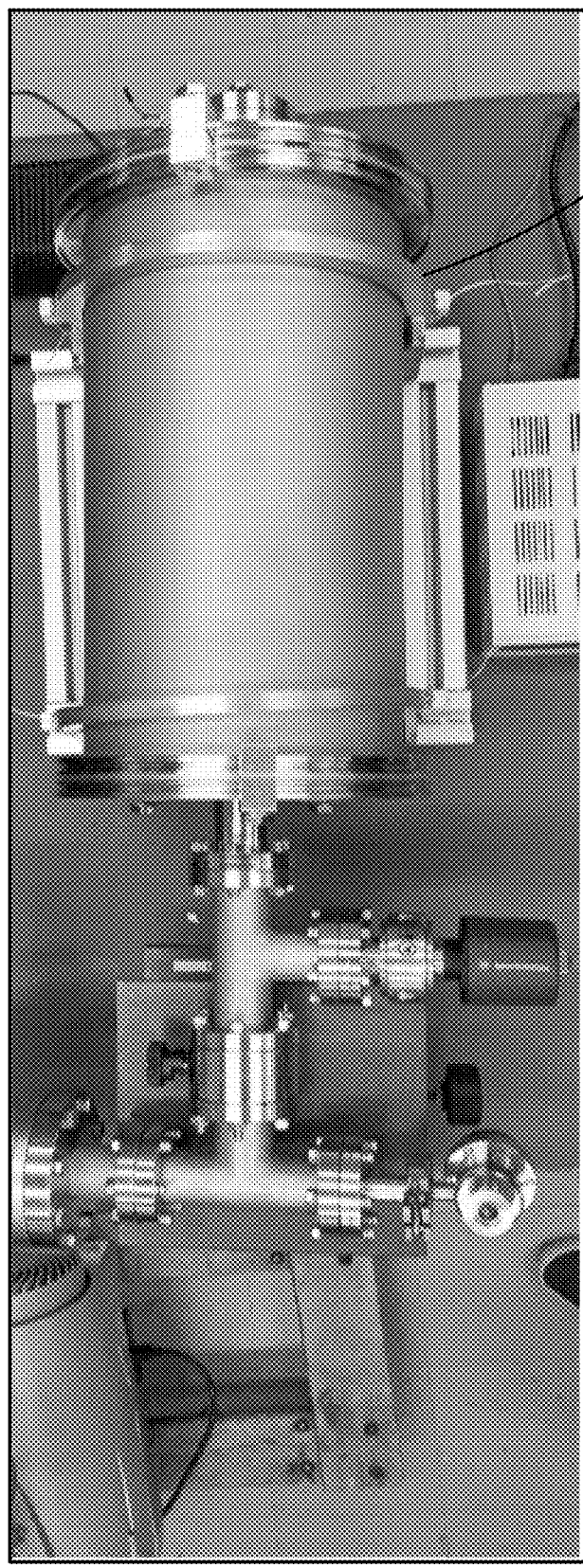

FIGS. 4A, 4B, and 4C shows several images of a vacuum chamber 192 used to simulate vacuum conditions for the characterization system 180. As shown, the vacuum chamber 192 may have a chamber that is sufficiently large to contain therein the characterization system 180 shown in FIG. 4B.

Figure 4D:
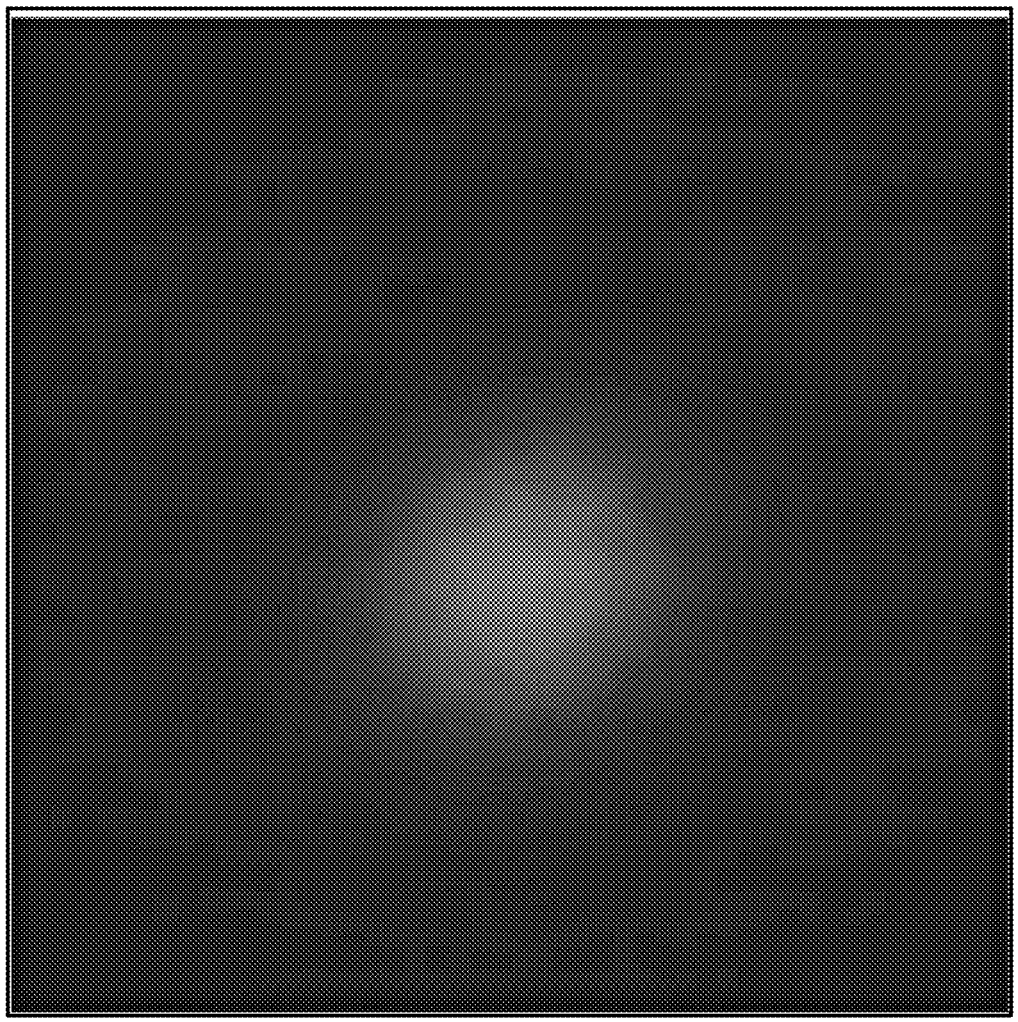
FIG. 4D shows an exemplary image captured by the camera in the characterization system of FIG. 4A.
Figure 4E:
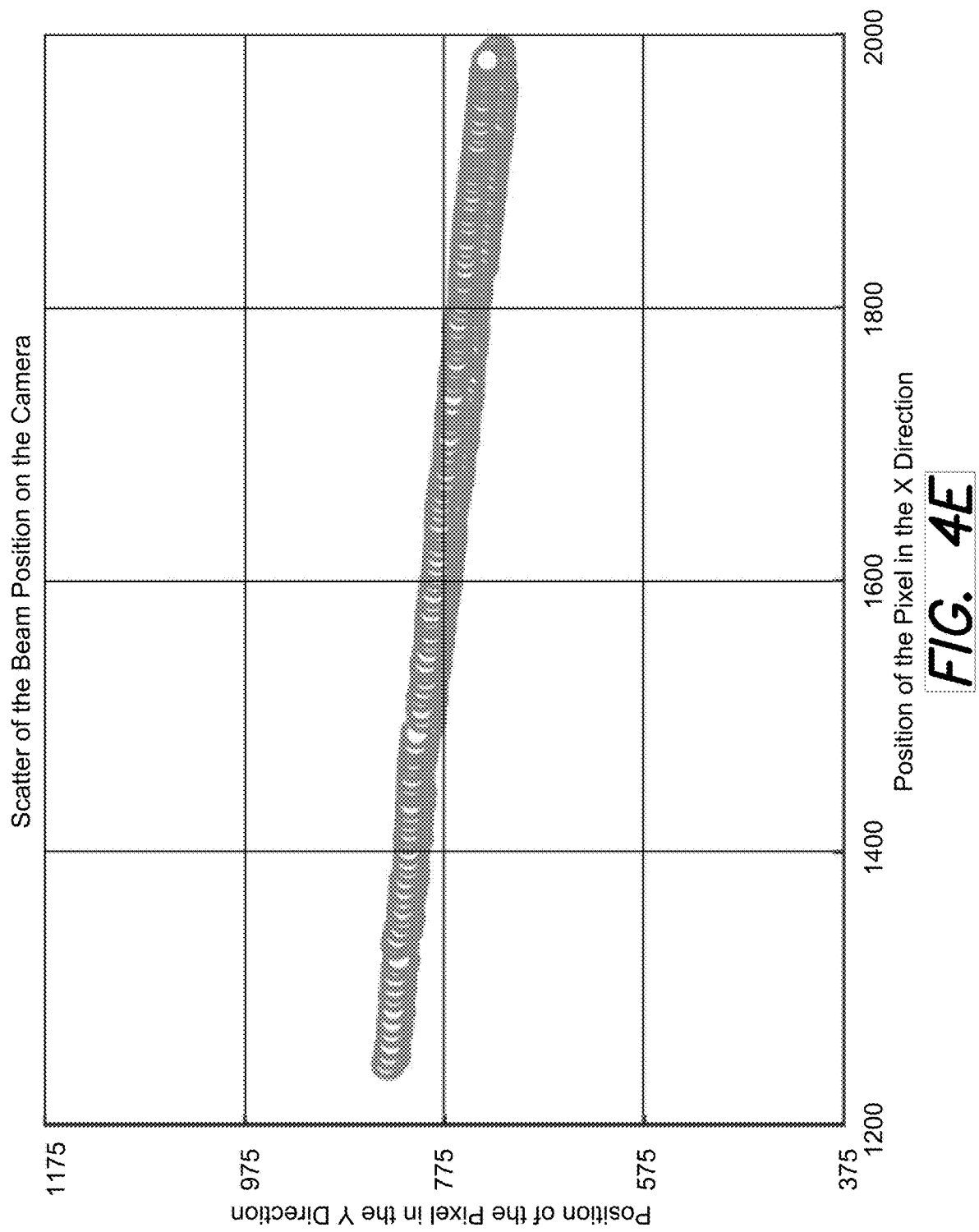
FIG. 4E shows a chart of the laser beam spot position detected by the camera in the characterization system of FIG. 4A.

FIGS. 4D and 4E show exemplary data captured by the camera 182. FIG. 4D shows an exemplary image of the spot size of the laser beam 124 detected by the camera 182. FIG. 4E shows a scatter plot of the position of the laser spot on the camera 182 over time. The position of the laser spot is based on the centroid of FIG. 4D. As shown, the scatter plot shows the liquid lens assembly 120 was actuated causing the laser beam 124 to be steered back and forth primarily along the X-axis of the liquid lens 132.

Figure 5A:
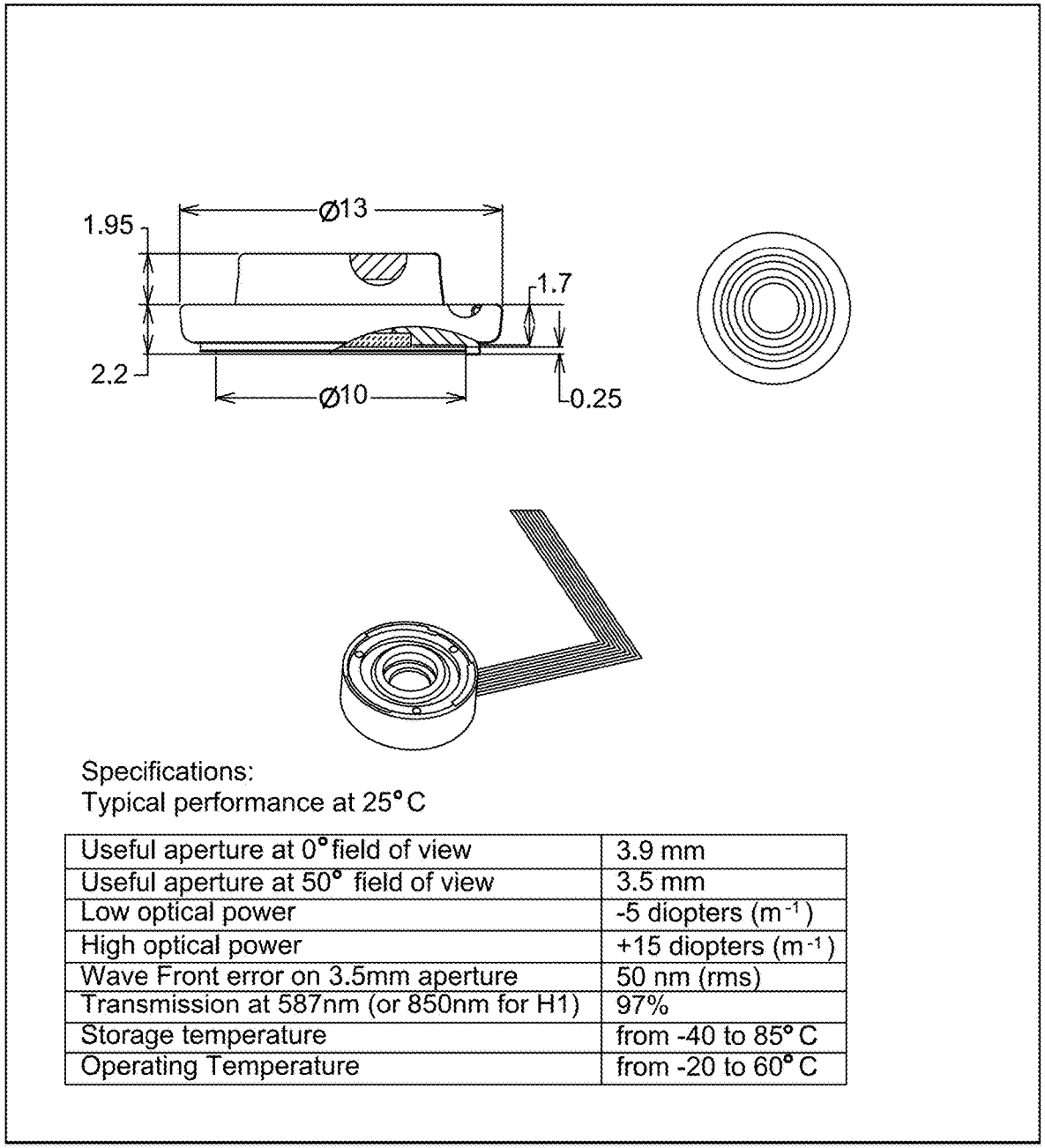
FIG. 5A shows a specification of an exemplary electrowetting liquid lens for use in the beam steering system. The lens is designed for variable focus products preferably having a large clear aperture: long focal objectives, large sensors, C-Mount objective lenses and laser beam shaping applications. The lens is suited for applications such as industrial vision, medical imaging cameras, optical equipment, biometric devices, etc. Features include a 13 mm outer diameter, 4.0 mm thickness, 3.9 mm clear aperture, being silent, focus range from 5 cm to infinity, and easy to integrate. The lens may be provided with (1) an anti-reflective coating in the visible range, (2) coating in the near-infrared, (3) no anti-reflective coating.
Figure 5B:
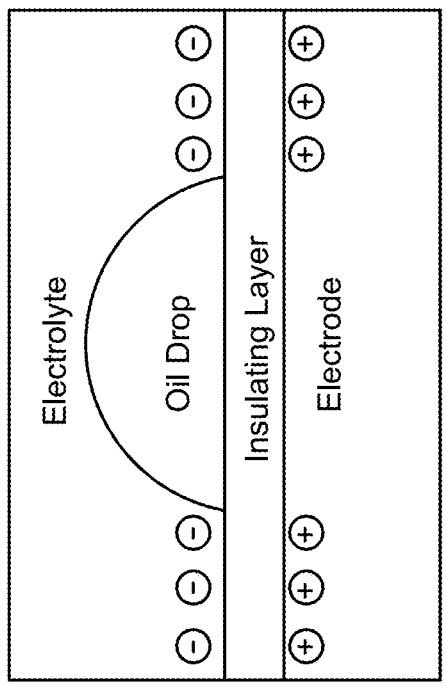
FIG. 5B shows an illustration of the operating principle of the liquid lens of FIG. 5A.
Figure 5B:
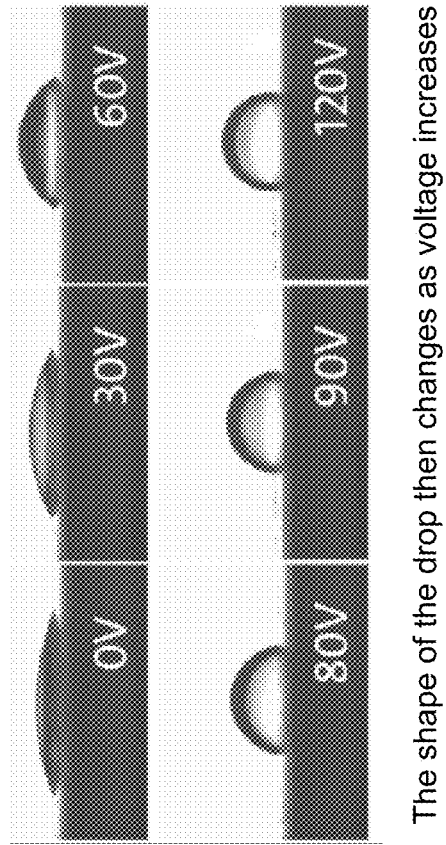

In one example, the liquid lenses 128 and 132 in the liquid lens assembly 120 may be Corning Varioptic A-39N0 electrowetting liquid lenses. FIGS. 5A and 5B provide specifications of the Corning Varioptic A-39N0 and an illustration of the operating principle. This particular lens may have a 3.9 mm aperture with a tuning range of −5 diopters to 15 diopters. The operating temperature range for this lens is −20° C. to 60° C. The lens is composed of an oil droplet submerged in an electrolyte. This is placed on top of an insulating layer with an electrode below. As voltage is applied between the electrolyte and electrode, the oil is forced into different curvatures. For testing, the liquid lens 132 was positioned with an offset of 1 mm from the optical axis of the liquid lens 128. The vacuum chamber 192 was configured to provide vacuum levels ranging between $10^{-4}$ Torr and 5 Torr.

Figure 5D:
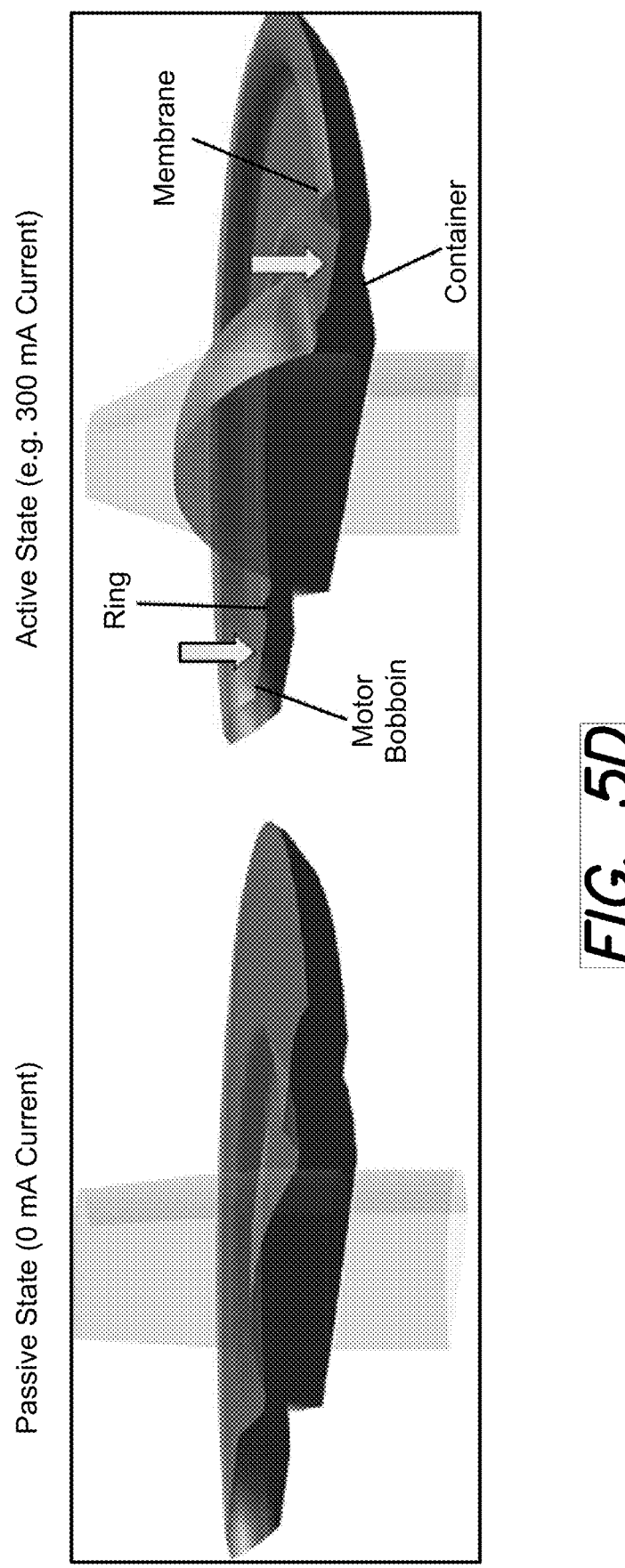
FIG. 5D shows an illustration of the operating principle of the liquid lens of FIG. 5C.

In the following description, a series of experiments were conducted to assess various aspects related to the operation of the liquid lens assembly 120 depicted in FIG. 4A. It should be appreciated the tests performed were primarily applied to an electrowetting liquid lens. However, pressure driven liquid lenses may also be used in the beam steering system 110. For example, FIGS. 5C and 5D provide specifications and the operating principle, respectively, of an Optotune EL-16-40-TC. This particular lens may have a 16 mm aperture with a tuning range of −10 diopters to 10 diopters. The operating temperature range for this lens is −20° C. to 65° C. The lens includes an optical fluid housed in a thin transparent membrane. To change the curvature of the lens, a ring pushes against this membrane, forcing the lens to change shape.

Survivability Test

Survivability tests were performed on the liquid lens assembly 120 to assess their operability under vacuum conditions. The liquid lens 128 and 132 were both Corning Varioptic A-39N0. The survivability tests involved exposing the liquid lenses 128 and 132 to a soft vacuum of approximately 5 Torr for a period of 72 hours. The camera 182 measured the steering performance of the beam steering system 110 under the following conditions: (1) before placing the characterization system 180 under vacuum, (2) immediately after removal of the characterization system 180 from the vacuum chamber 192, and (3) three days after removing the characterization system 180 from the vacuum chamber 192. For each measurement, the liquid lens assembly 120 steered the laser beam 124 to six locations on the camera 182 for ten seconds at each location. The laser beam 124 was focused at each location.

Figure 6A:
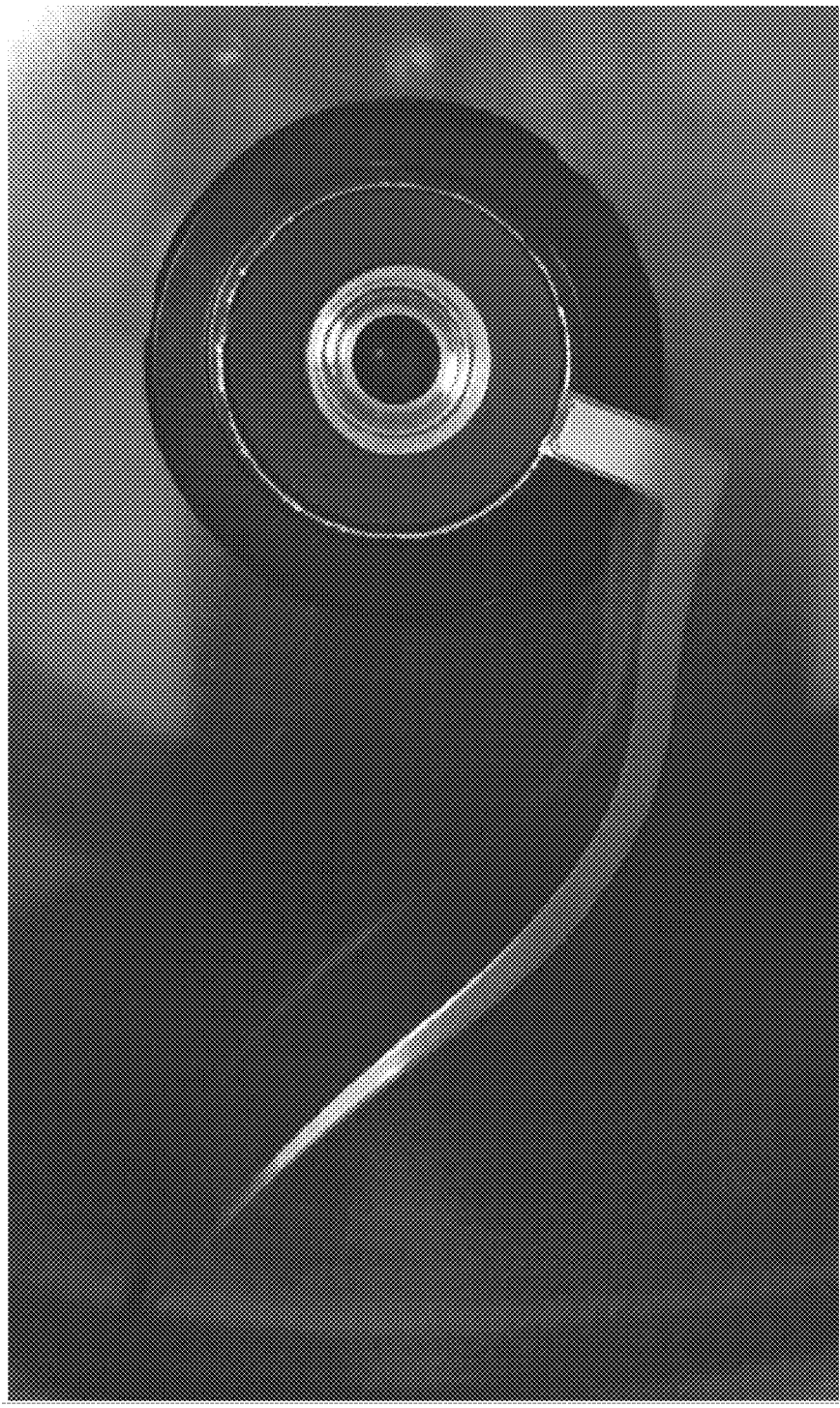
FIG. 6A shows an image of an exemplary liquid lens in a soft vacuum.
Figure 6B:
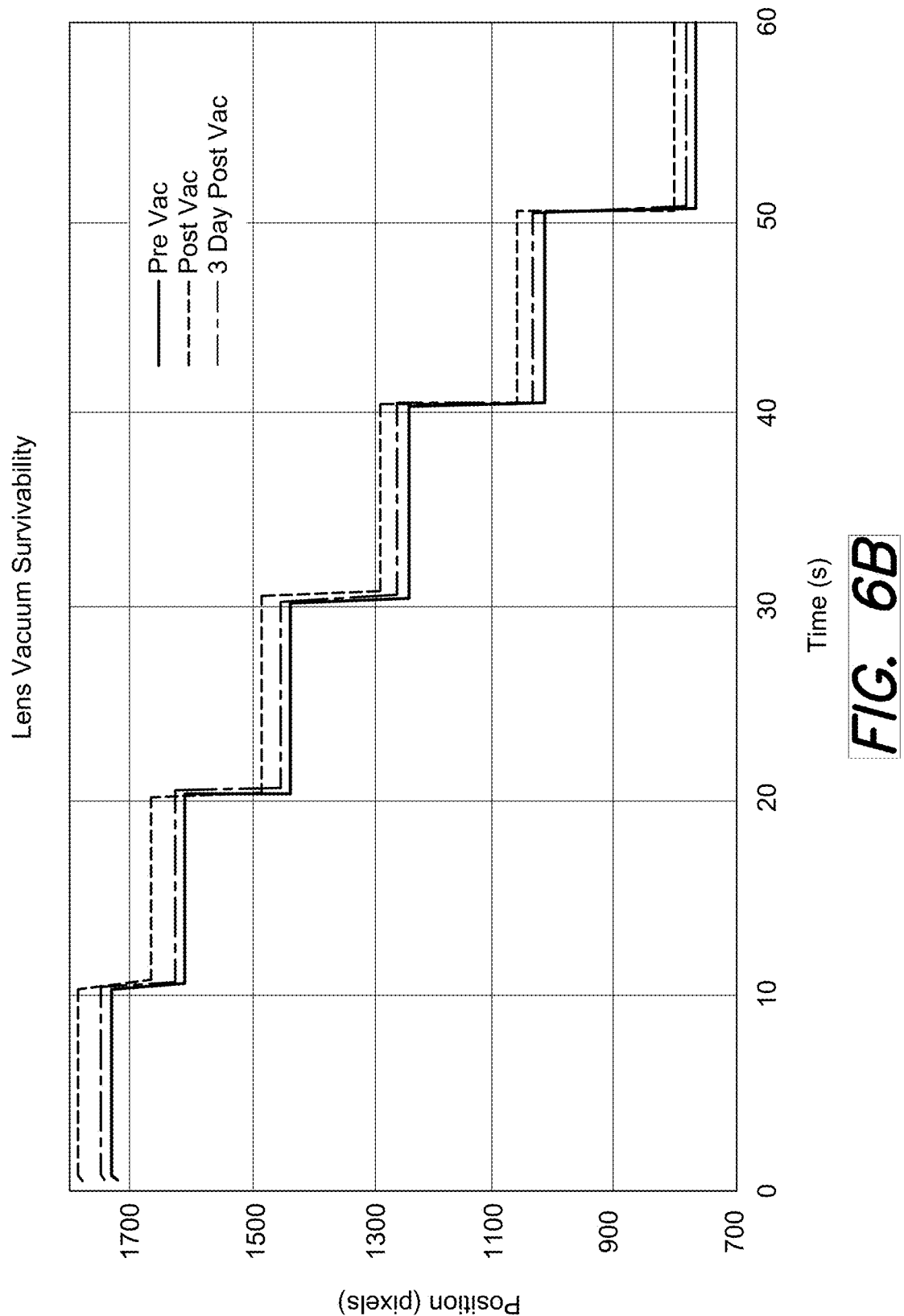
FIG. 6B shows the beam steering capability of the liquid lens of FIG. 6A as a function of time under various ambient and vacuum conditions.

FIG. 6A shows an image of an exemplary liquid lens under the soft vacuum conditions described above. The liquid lens did not undergo any visually observable physical changes. For instance, the optical fluid did not leak and no deformations to the lens aperture were observable. FIG. 6B shows positional data of the laser beam 124 on the camera 182 as a function of time for the three conditions described above. As shown, the beam steering system 110 positioned the laser beam 124 at six locations on the camera 182. For reference, only the liquid lens 132 was exposed to vacuum in order to reduce possible damage to the hardware.

The positional data of the three conditions indicates the trends (e.g., the relative change between each beam configuration) are similar. It can also be observed the positional data for each condition is offset from the other conditions. Several factors may have contributed to these offsets including changes to the alignment between the laser 122, the liquid lens assembly 120, and the camera 182 when extracting and inserting the liquid lens 132 in the liquid lens assembly 120. Nevertheless, the similar trends observed indicate the liquid lens 132 maintains the same beam steering capability before and after exposure to a vacuum environment.

Steering Test

Steering tests of the liquid lens assembly 120 were also performed in order to derive a transfer function to correlate the steering angle of the laser beam 124 (after passing through the liquid lens assembly 120) with the input voltage for the liquid lens 132. For these measurements, the input voltage applied to the liquid lens 132 (i.e., the steering lens) was swept back and forth between 30 V and 59 V. An autofocus controller was also used to adjust the input voltage applied to the liquid lens 128 (i.e., the on-axis lens) in order to maintain a small spot size on the detector of the camera 182 during measurement. The liquid lenses 128 and 132 were Corning Varioptic A-39N0 electrowetting liquid lenses.

The displacement of the beam spot on the camera 182 was used to determine the steering angle. Steering tests were performed in both ambient and vacuum conditions to assess the operability of the liquid lens assembly 120 under vacuum. The liquid lens 132 was positioned with a 1 mm offset from the optical axis of the liquid lens 128.

Under ambient conditions, the beam steering system 110 was able to steer the laser beam 124 1.31° left of center and 1.41° right of center, where the center corresponds to the liquid lens 132 being substantially flat such that no deflection of the beam 124 occurs. This corresponds to a total steering range of 2.72°. Under vacuum conditions, the steering range of the beam steering system 110 was nearly the same with the laser beam 124 being steered 1.31° left of center and 1.39° right of center resulting in a total steering range of 2.71°. The errors in this data was measured to be $10^{-2}$ degrees. FIG. 7A provides a summary of the results.

Figure 7B:
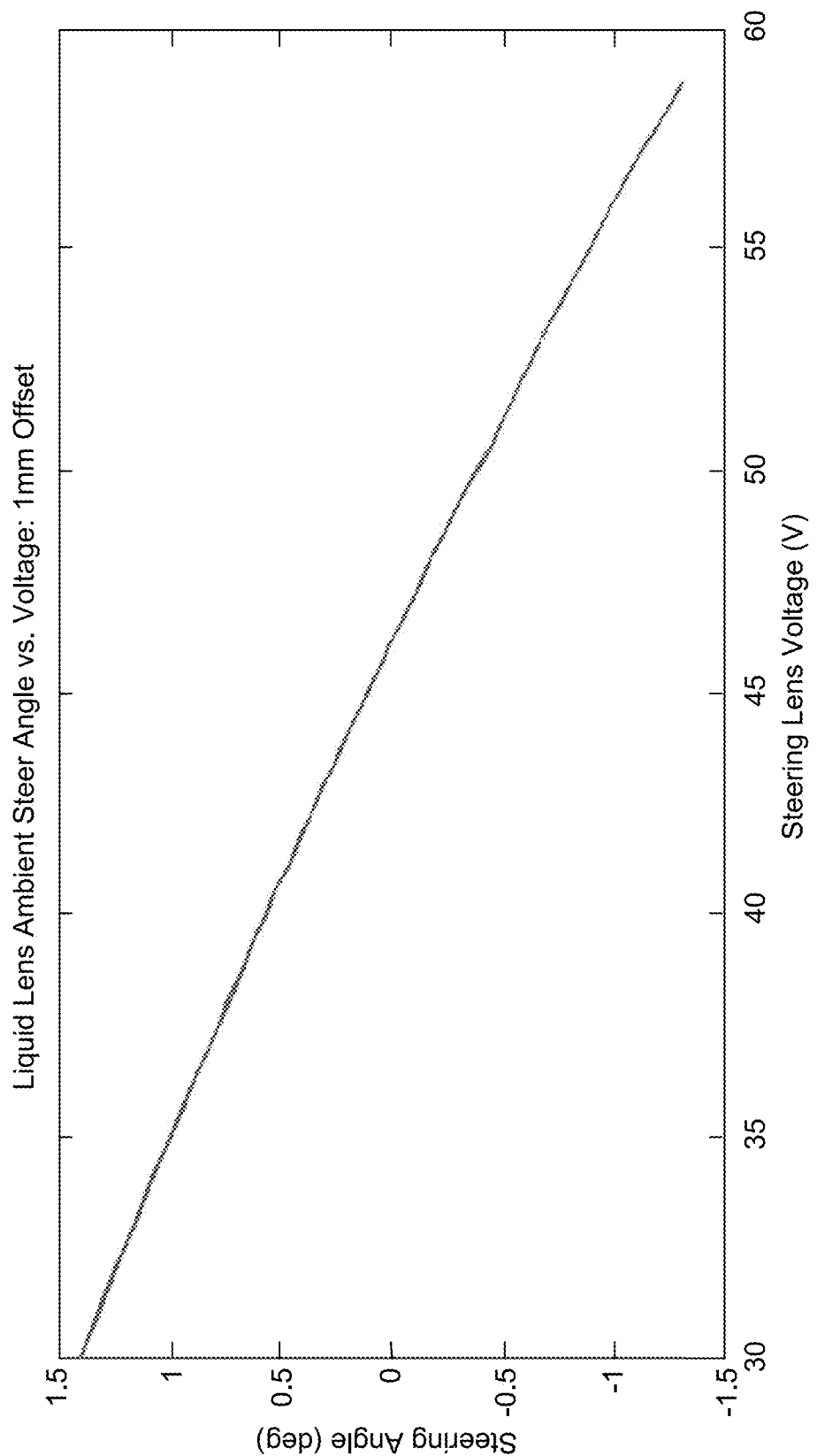
FIG. 7B shows the steering angle of the liquid lens of FIG. 6A as a function of the steering lens voltage at a 1 mm offset under ambient conditions.

FIG. 7B shows the steering angle of the beam steering system 110 as a function of the input voltage under ambient conditions. The input voltage was swept between 30 V and 59 V for a total often sweeps. The data shows that for the tested liquid lens assembly 120, the small steering range resulted in the steering angle being approximately linearly proportional with the input voltage with a slope of approximately 0.0461°/V. The steering angle of 0° occurs at approximately 45 V, corresponding to the voltage where the liquid lens 132 transitions from a concave to a convex curvature.

Figure 7C:
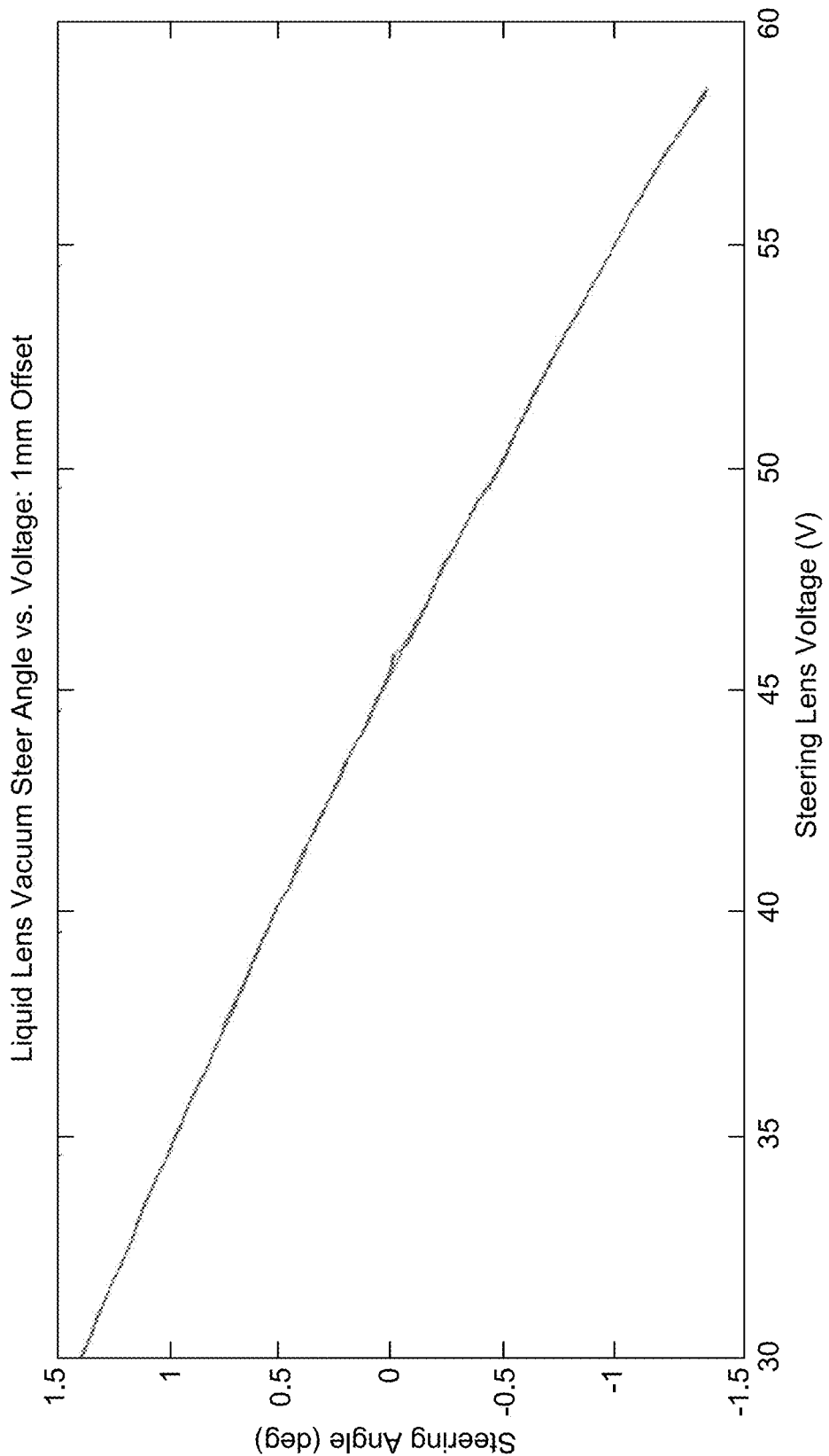
FIG. 7C shows the steering angle of the liquid lens of FIG. 6A as a function of the steering lens voltage at a 1 mm offset under vacuum conditions.

FIG. 7C shows the steering angle of the beam steering system 110 as a function of the input voltage under vacuum conditions. The input voltage was swept between 30 V and 59 V for a total of four sweeps. As before, the curve relating the steering angle to the input voltage is relatively linear with a slope of approximately 0.0459°/V, which is substantially similar to the measurements taken under ambient conditions.

Figure 7D:
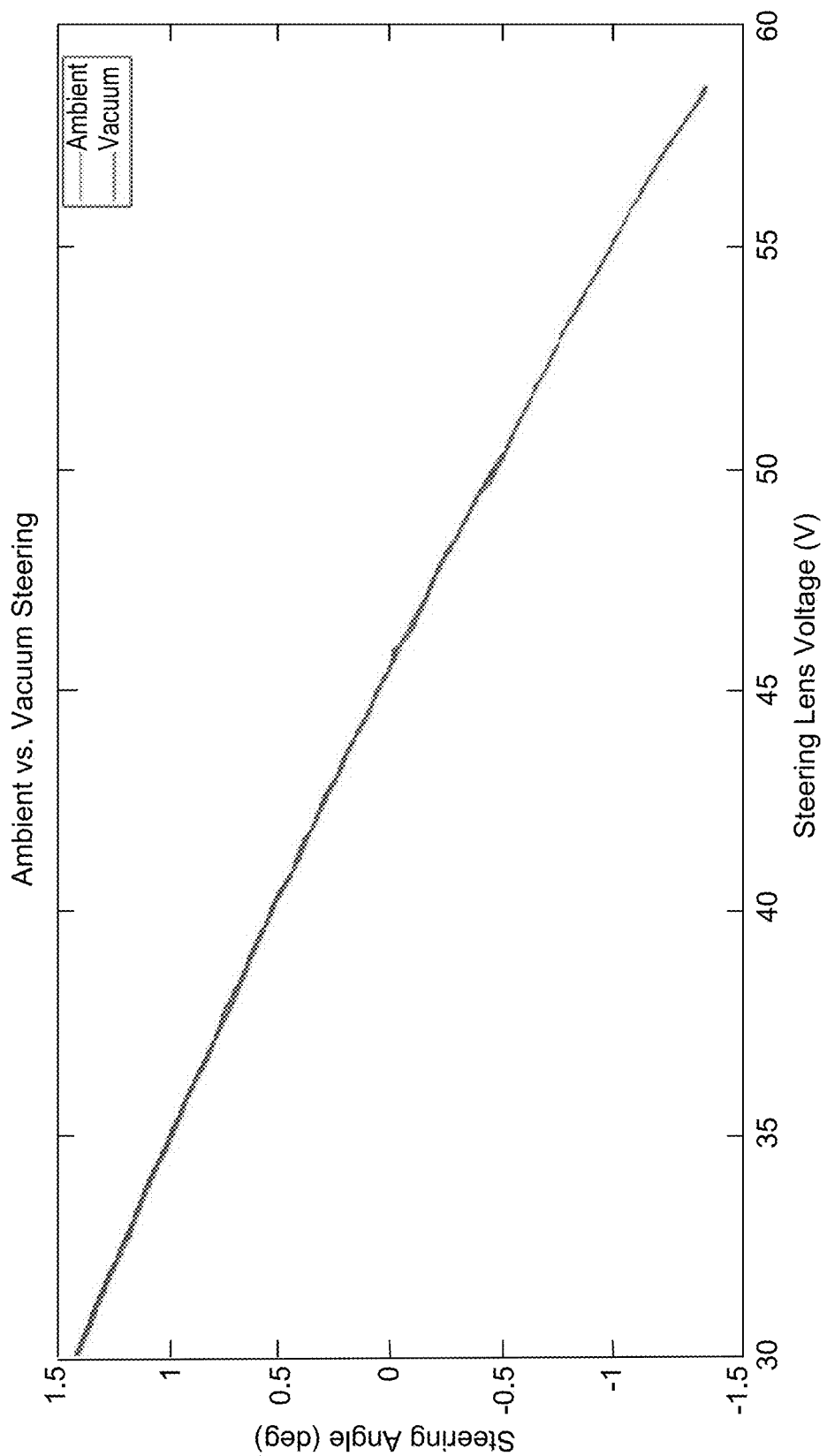
FIG. 7D shows a comparison of the steering angle of the liquid lens under ambient and vacuum conditions as shown in FIGS. 7B and 7C, respectively.

FIG. 7D shows the steering vs. input voltage curves for ambient conditions (i.e., FIG. 7B) and vacuum conditions (i.e., FIG. 7C) overlaid onto one another to provide a comparison. For the input voltage range used, the steering capability of the Corning Varioptic A-39N0 liquid lens remains substantially similar between both ambient and vacuum conditions. As shown, the curves representing the ten voltage sweeps in ambient conditions and the four voltage sweeps in vacuum conditions substantially overlap with one another and are both substantially linear. These results suggest commercially available liquid lens technology may operate in a vacuum environment representative of the space environment of the satellite 100.

Figure 7E:
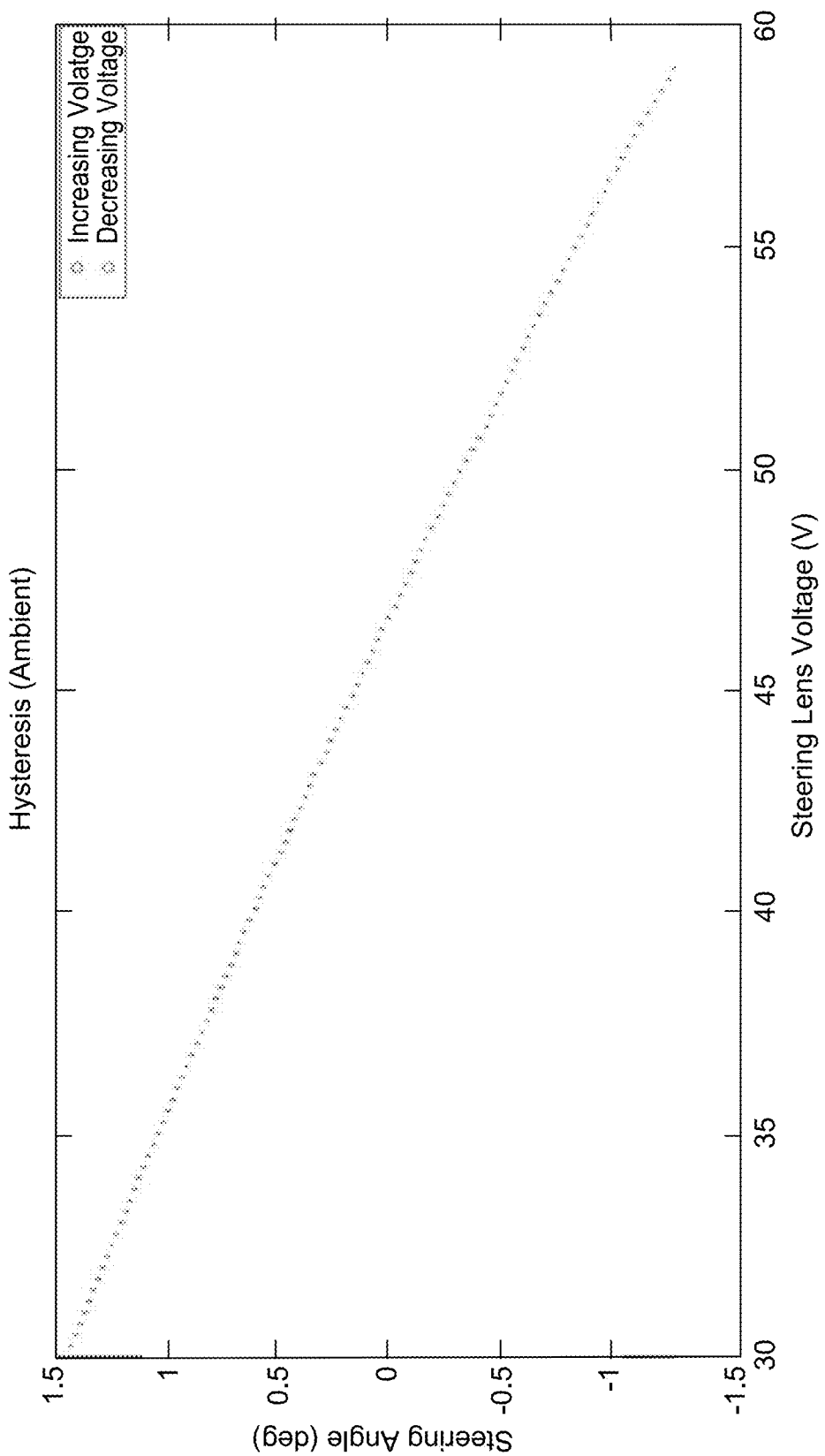
FIG. 7E shows the hysteresis of the steering angle of the liquid lens of FIG. 6A when increasing and decreasing the steering lens voltage under ambient conditions.
Figure 7F:
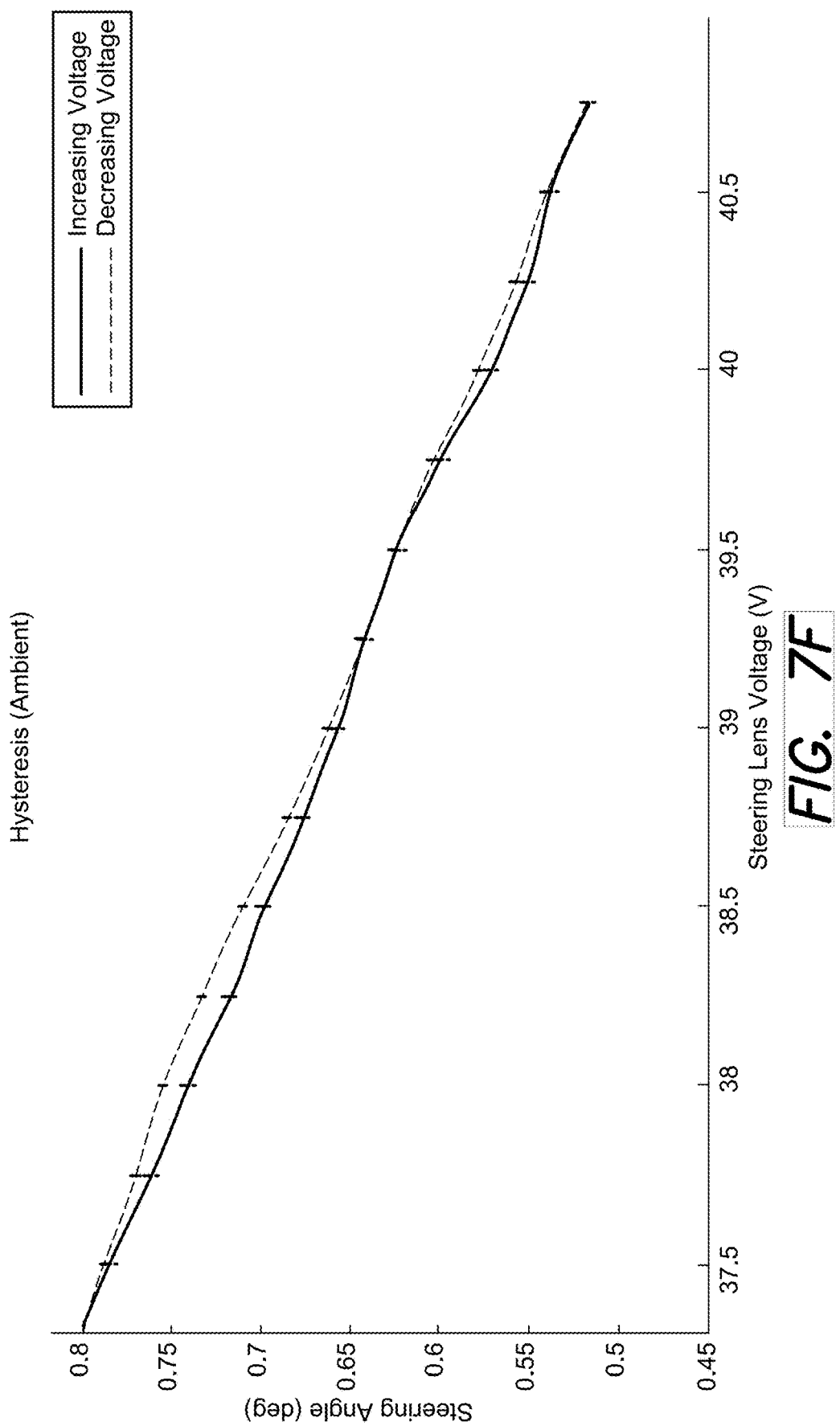
FIG. 7F shows a magnified view of the hysteresis of FIG. 7E.

The hysteresis of the beam steering system 110 may also be assessed by analyzing differences in the steering angle as the input voltage increases and decreases. FIG. 7E shows the steering angle of the beam steering system 110 as a function of the input voltage under ambient conditions as the input voltage is increased and decreased. As shown, the position data are substantially similar both in trend and in magnitude. Some hysteresis is observable at input voltages between 37 V and 40 V. FIG. 7F shows a magnified view of the data in FIG. 7E at input voltages between 37.5 V and 40.5 V. As shown, the steering angle is smaller in magnitude when the input voltage increases compared to the case where the input voltage decreases across this input voltage range. However, the largest observable hysteresis was found to be approximately 0.02° at 38.25 V. This error was concluded to be sufficiently small for the purposes of operating the beam steering system 110 in a satellite 100.

Figure 7G:
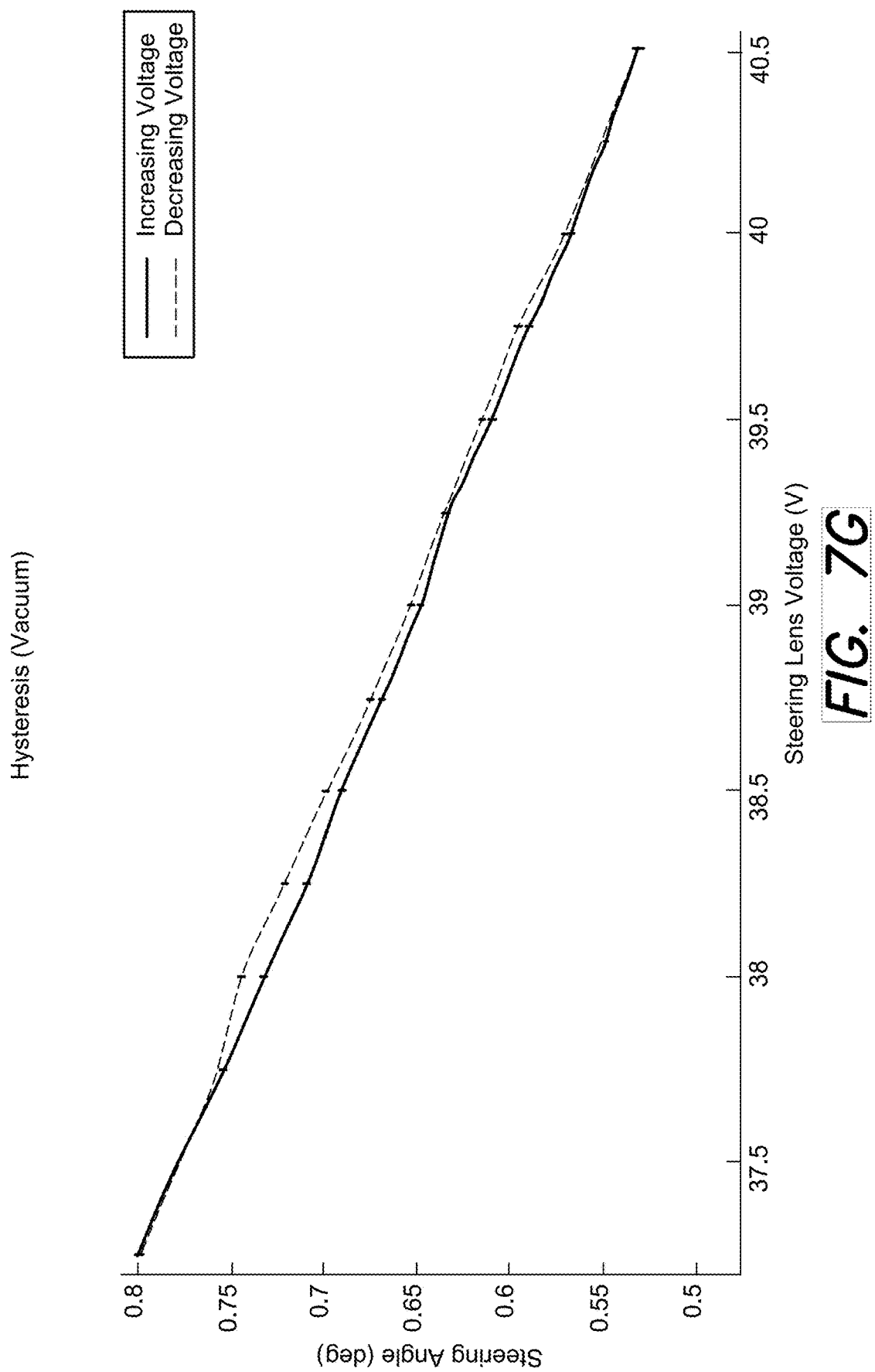
FIG. 7G shows the hysteresis of the steering angle of the liquid lens of FIG. 6A when increasing and decreasing the steering lens voltage under vacuum conditions.

FIG. 7G shows the steering angle of the beam steering system 110 as a function of the input voltage under vacuum conditions as the input voltage is increased and decreased. Compared to FIG. 7F, the positional data in FIG. 7G is substantially similar. As before, the steering angle is lower when the input voltage increases compared to when the input voltage decreases. Similarly, the largest observable hysteresis was found to be approximately 0.02°.

Frequency Response Testing

A laser communication system on a satellite should generally include a beam steering system that provides a sufficiently fast steering response to meet the particular pointing specifications of the communication system. The responsivity of the beam steering system 110 described herein depends, in part, on the dynamics of the beam steering system 110, particularly the liquid lens assembly 120. In order to assess the dynamics of the liquid lens assembly 120, which includes the resonances supported in each liquid lens and the liquid lens assembly 120 as well as the ability of each liquid lens to respond to a step input, a frequency response test was performed on the beam steering system 110. The liquid lenses 128 and 132 were Corning Varioptic A-39N0 electrowetting liquid lenses.

In particular, the beam steering system 110 was configured to steer the laser beam 124 between two focused spots on the focal plane of the camera 182 at varying rates. The two spots were nominally separated by a distance corresponding to 6 pixels on the camera 182. The frequency at which the laser beam 124 was switched between the two spots ranges from 1 Hz to 200 Hz. The beam steering system 110 was tested in both an ambient air environment and vacuum conditions in the chamber 192.

Figure 8A:
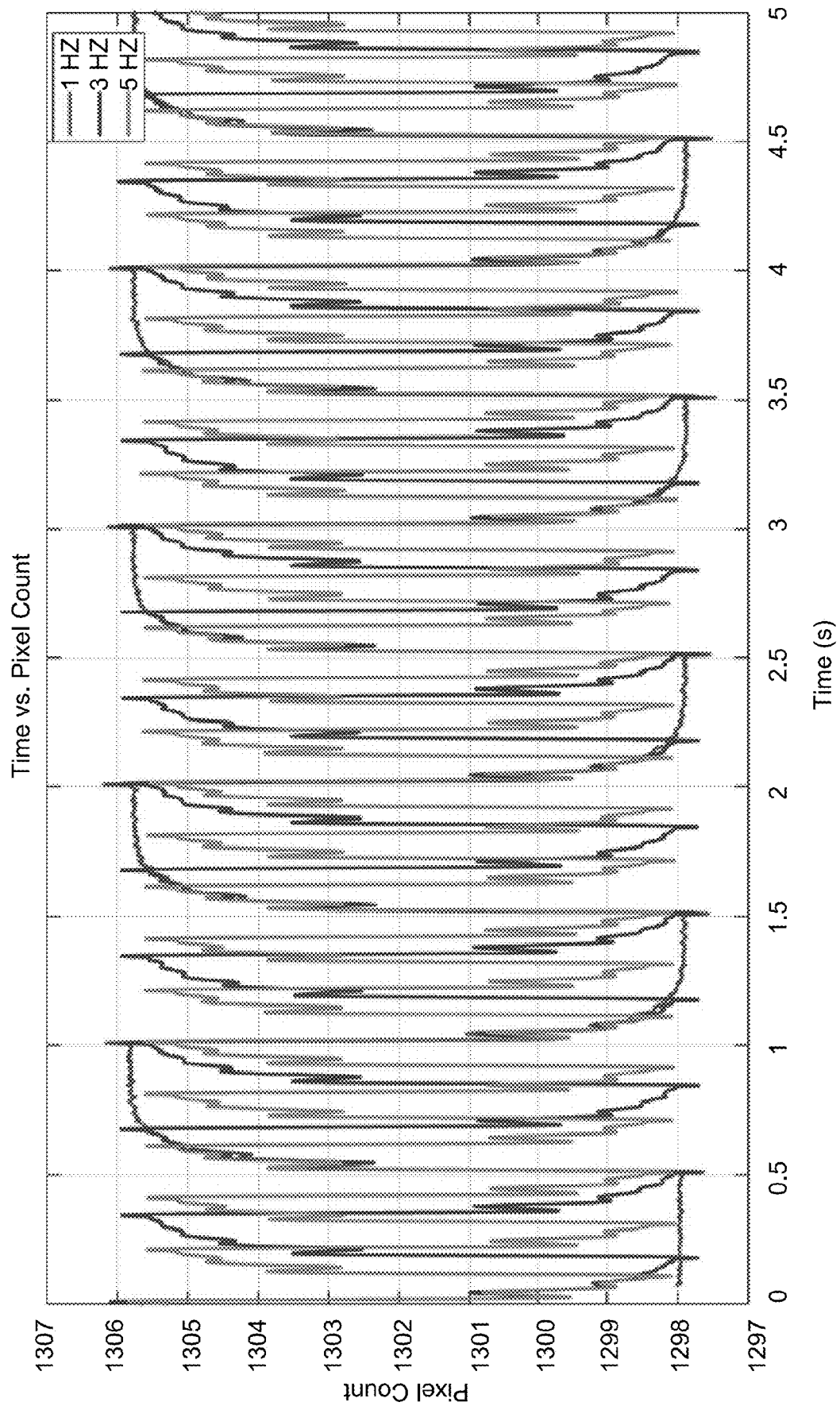
FIG. 8A shows the temporal response of the liquid lens of FIG. 6A at various actuation frequencies under ambient conditions.

FIG. 8A shows the step response of the beam steering system 110 at frequencies of 1 Hz, 3 Hz, and 5 Hz. At these lower frequencies, the rise time in the response of the liquid lens can be observed. As shown, the rise time (e.g., the amount of time transpired for the liquid lens to reach 90% of the prescribed step input) was about 0.25 seconds. FIG. 8A also shows the amplitude of the step response on the camera 182 was about −8 pixels despite the prescribed distance between the two spots being ~6 pixels. This discrepancy may be attributed to the pixel count in FIG. 8A corresponding to the number of pixels along the X axis of the camera 182 where the two beam spots traced a line that was at an angle relative to the X axis.

Figure 8B:
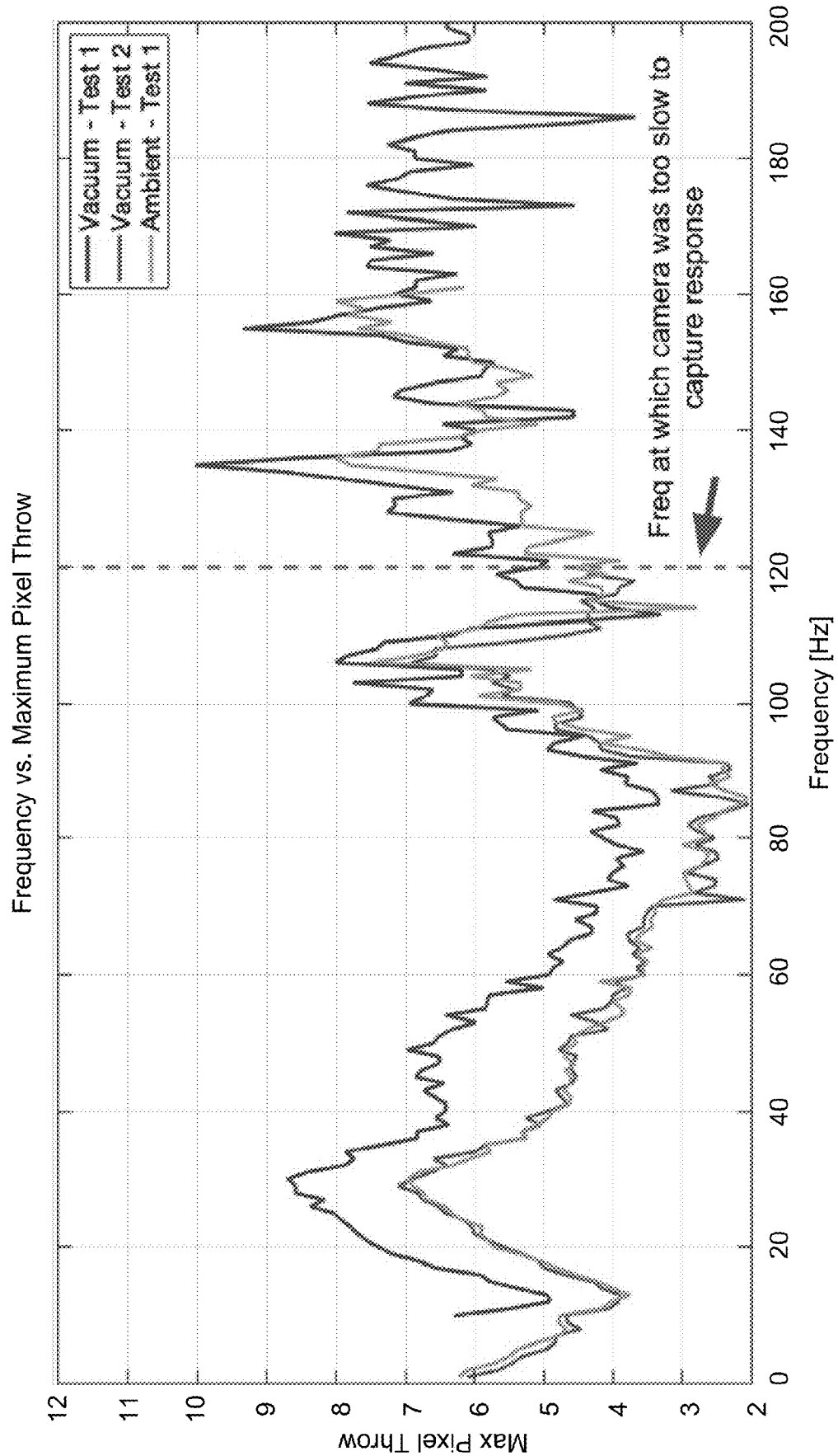
FIG. 8B shows the frequency response of the liquid lens of FIG. 6A based on the temporal response measured under ambient and vacuum conditions.

FIG. 8B shows the step input response of the beam steering system 110 as a function of frequency for both ambient and vacuum conditions. The "Vacuum—Test 1" data was acquired by dwelling at each frequency for 100 oscillations. The "Vacuum—Test 2" data was acquired by dwelling for 5 seconds at each frequency in order to increase the amount of data collected at each frequency. First, the frequency spectra show the response of the beam steering system 110 is substantially similar between vacuum and ambient environments. Second, two peaks at 30 Hz and 105 Hz can be observed, which correspond to resonances within the liquid lens. Third, the frequency response drops below 6 pixels of throw (e.g., the nominal amount) at 5-15 Hz and 35-100 Hz, which suggests the liquid lens was unable to respond quickly enough to reach the prescribed pixel distance between the two beam spots before the voltage input switched to move the laser beam 124 to the other spot. Said in another way, the response of the beam steering system 110 lagged behind the input.

Thermal Testing

In a space environment, components that draw large amounts of power should be adequately cooled (e.g., via a heat sink) in order for the components to remain within the desired operational temperature limits. For the exemplary electrowetting liquid lens depicted in FIG. 6A (e.g., the Corning Varioptic A-39N0), these type of lenses do not draw an electrical current that is sufficiently large to cause substantial heat generation when in a vacuum environment.

For comparison, a pressure driven liquid lens (e.g., the Optotune EL-16-40-TC) may use a voice coil to apply a pressure to the optical fluid in order to change the diopter. In some cases, the voice coil may draw a sufficiently large electric current to cause appreciable heat generation in the lens. To ascertain the extent such heating may occur, thermal tests were performed where the temperature of the liquid lens was monitored when receiving electrical current inputs approaching the specified operating limits of the lens (i.e., up to 294 mA). The temperature was monitored using an integrated temperature sensor in the lens.

Figure 9:
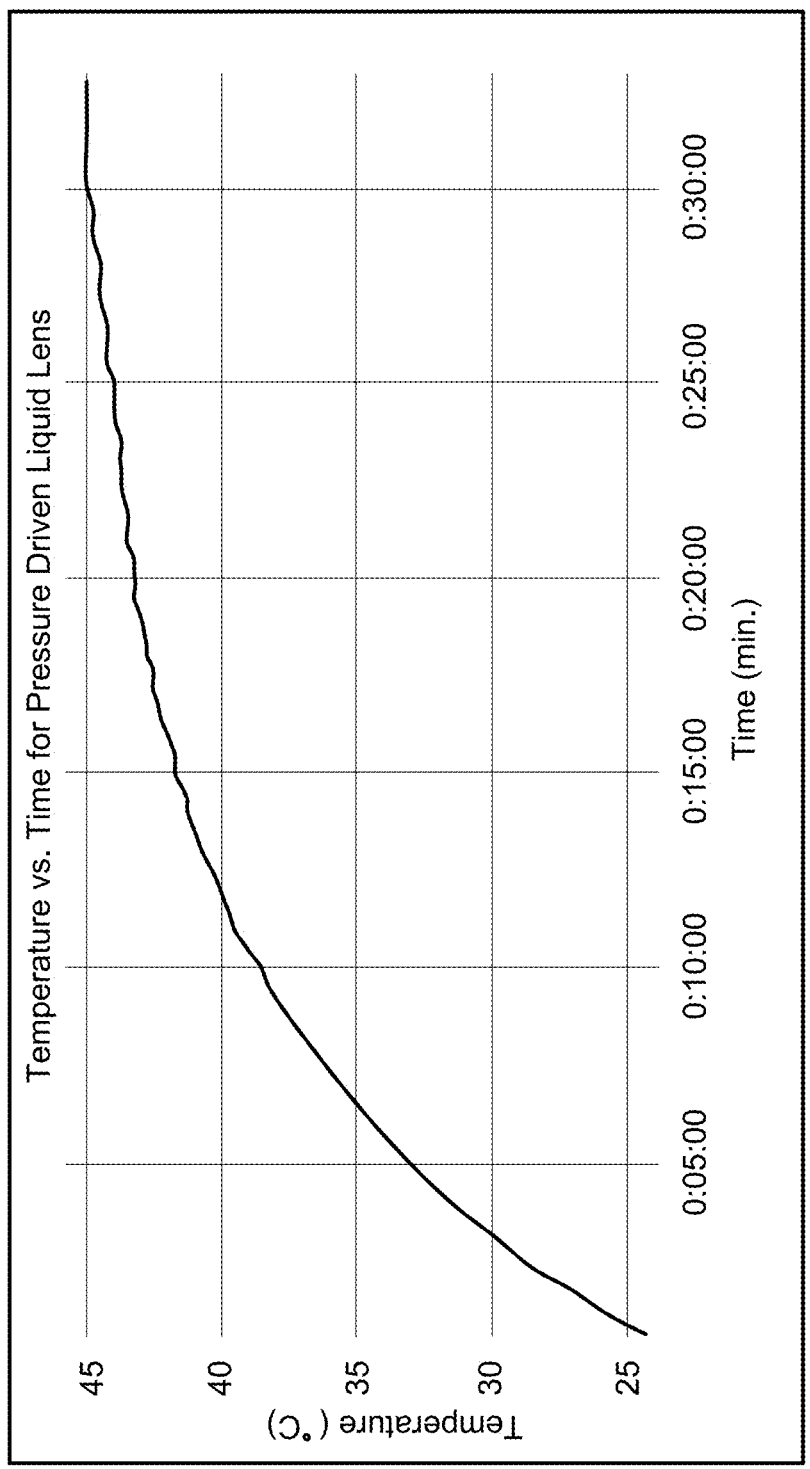
FIG. 9 shows the temperature of an exemplary pressure driven liquid lens in ambient conditions.

Initial thermal tests were performed in ambient conditions to provide a lower bound estimate of possible heating effects on the liquid lens during operation. FIG. 9 shows the temperature of the lens as a function of time. The lens received an electric current of 294 mA and was not activated until the measurement began, hence, the initial temperature corresponded to the ambient temperature. As shown, the temperature of the liquid lens followed a first-order heating response that took around 30 minutes to reach a steady-state temperature of 45° C. It should also be noted the software controlling the operation of the liquid lens provided an option to set the operating temperature of the lens by adjusting at least the input current to maintain the desired temperature. In some tests, the temperature was set to 45° C., the highest operating temperature for the particular lens tested, and the input electric current remained constant.

Beam Quality Testing

The design of an optical system (e.g., the layout of the optical elements) may have an effect on the optical performance and error of the system. For laser communication systems, the optical performance and error may impact the optical communications link budget. In particular, the divergence of the transmit laser beam 124 outputted by the satellite 100 may be the primary factor in determining the link transmit gain. Generally, a low divergence is preferable to increase data transfer rates.

A suboptimal beam quality in the laser beam 124 may have negative effects on the divergence of the laser beam 124. In the case of the liquid lens assembly 120, several factors may contribute to a poor beam quality including, but not limited to (a) wave front errors caused by decentered lenses (e.g., the liquid lens 132) and (b) the spherical aberration of the liquid lens, which increases as the laser beam 124 is steered to higher angles due to a reduction in the radius of curvature at higher input voltages.

To this end, the beam steering system 110 was tested to assess how steering via liquid lenses affects the divergence of the laser beam 124. To quantify the beam quality of the laser beam 124, a beam quality factor, $M^2$, may be used. $M^2$ is a unitless number that describes how close a laser beam is to an ideal Gaussian beam. If $M^2$ is equal to one, the laser beam is Gaussian and will exhibit ideal divergence and low diffraction. Higher values of $M^2$ correspond to the laser beam being less Gaussian resulting in the beam diffracting more quickly and, hence, increasing the divergence.

Precise empirical measurements of $M^2$ (i.e., the beam divergence) may be difficult to perform unless expensive equipment is used. Thus, to study $M^2$ for the beam steering system 110 described herein, a computational optical simulation was performed instead. In particular, the optical simulation may be a ray tracing simulation designed to simulate light propagation in the geometric ray optics regime. In this simulation, geometric models of the liquid lens may be used to recreate the liquid lens assembly 120 in a realistic manner. For instance, the model may include the first liquid lens 128 to control the collimation of the laser beam 124 and the second liquid lens 132, which is decentered from first liquid lens 128, to control the steering angle of the beam 124.

The optical simulation was configured to produce a plot of the expected beam divergence error as a function of the steering angle for a beam steering system 110 designed to steer a laser beam 124 along two axes. The $M^2$ factor and the divergence angle of the outputted laser beam 124 was determined by propagating light ray's representative of the laser beam 124 through each optical surface in the beam steering system 110 from the laser 122 to the output aperture of the liquid lens assembly 120. Diffraction and aberration effects at each surface were considered.

Figure 10A:
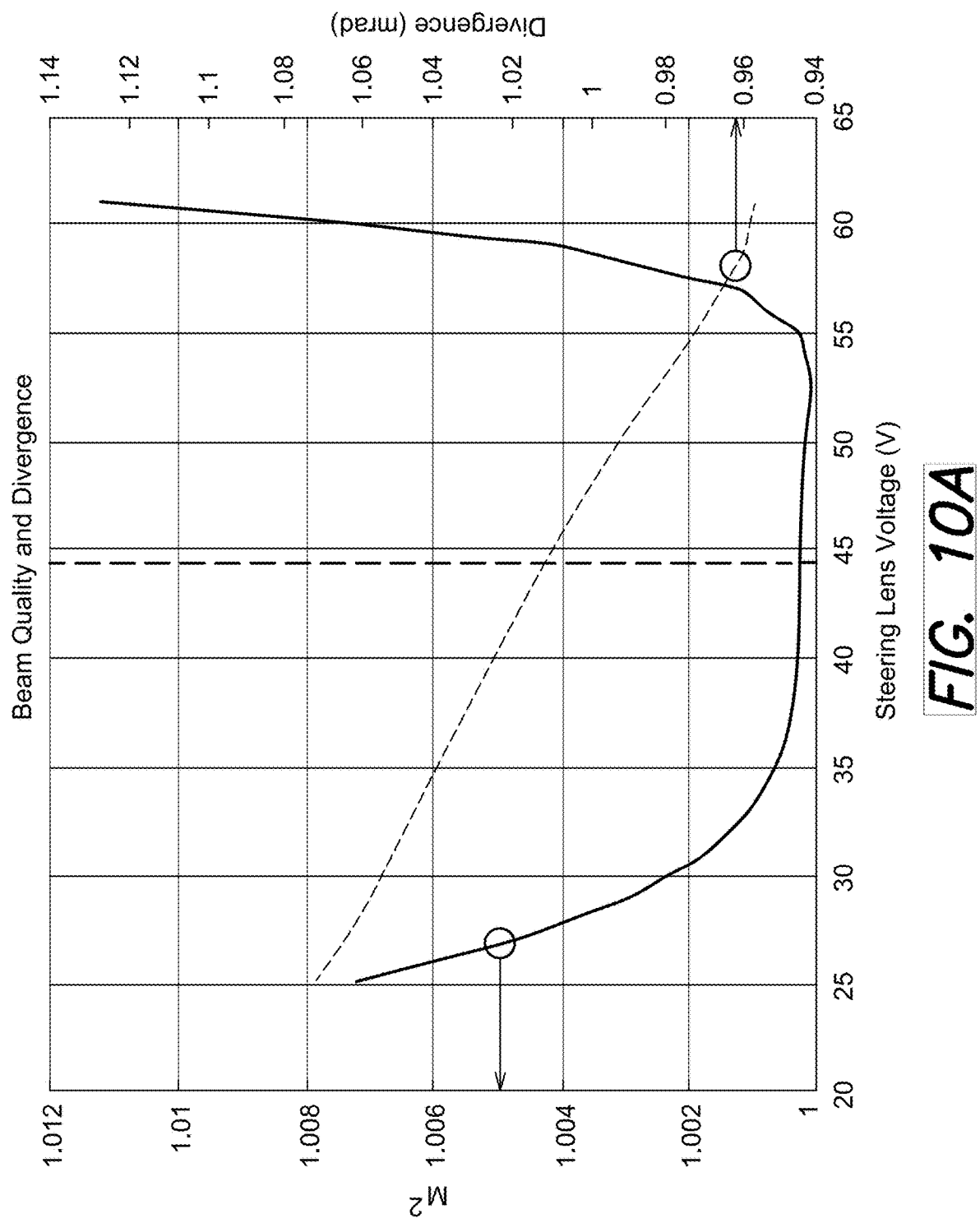
FIG. 10A shows the beam quality factor and the output beam divergence of the liquid lens of FIG. 6A.

FIG. 10A shows a plot of the $M^2$ factor and the divergence angle as a function of the input voltage to the liquid lens 132 (i.e., the steering lens). In this simulation, the lens was modeled based on the Corning Varioptic A-39N0 electrowetting liquid lens. Based on the empirical steering tests described above, an input voltage of 45 V corresponds to a steering angle of 0° (i.e., no steering occurs). As shown, small steering angles (e.g., input voltages centered around 45 V) exhibit $M^2$ factors near unity corresponding to low beam aberrations. As the input voltages increase above 55 V or decrease below 35 V, the $M^2$ factor increases rapidly suggesting larger aberrations at larger steering angles.

FIG. 10A also shows the beam divergence decreases as the input voltage increases. This trend may be attributed to the liquid lens 128 (i.e., the focusing lens) having to expand the laser beam 124 to maintain a focused spot on the camera 182 at higher input steering voltages. Thus, the beam divergence improves at higher input voltages. Thus, the $M^2$ factor does not appear to be a dominant factor on the beam divergence for the liquid lens tested.

Figure 10B:
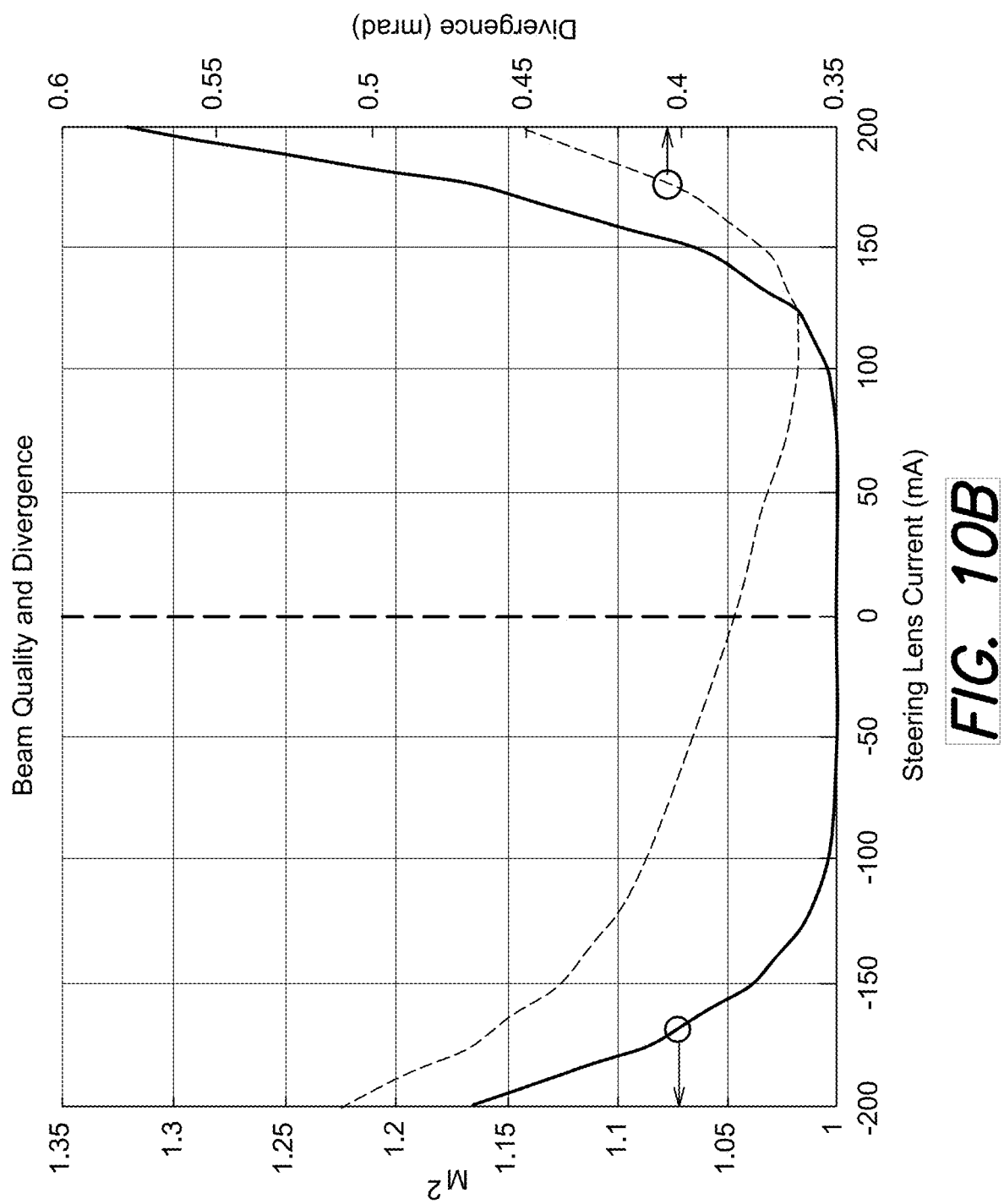
FIG. 10B shows the beam quality factor and the output beam divergence of an exemplary pressure driven liquid lens.

FIG. 10B shows a plot of the $M^2$ factor and the divergence angle as a function of the input voltage to the liquid lens 132 (i.e., the steering lens) for the case where the lens is modeled based on an Optotune EL-16-40-TC pressure driven liquid lens. As shown, the $M^2$ factor is similar to the exemplary electrowetting liquid lens of FIG. 10A. The difference between the two types of lenses is the Optotune EL-16-40-TC liquid lens has a larger lens aperture than the Corning Varioptic A-39N0 liquid lens, which causes the beam quality to have a larger effect on the beam divergence. As a result, the beam divergence is worse at the steering angle limits of the Optotune EL-16-40-TC liquid lens.

Figure 10C:
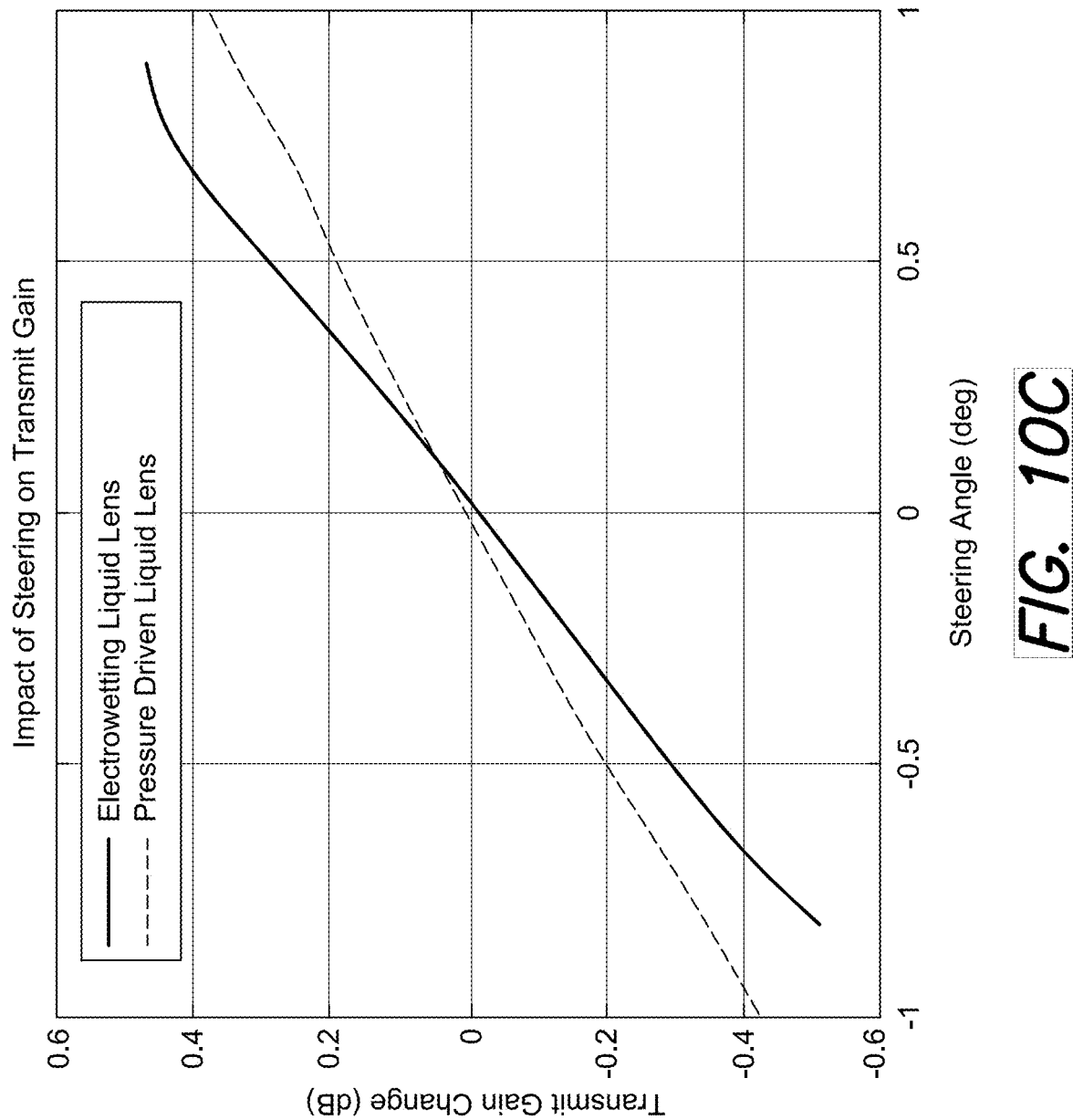
FIG. 10C shows transmit gain change as a function of the steering angle for the electrowetting liquid lens of FIG. 10A and a pressure driven liquid lens of FIG. 10B.

FIG. 10C shows the transmit gain of the beam steering system 110 as a function of the steering angle of the laser beam 124 for the electrowetting liquid lens of FIG. 10A and the pressure drive liquid lens of FIG. 10B. For positive steering angles, the transmit gain increases for both lenses. This may again be attributed to the liquid lens 128 functioning as a beam expander that decreases the beam divergence. FIG. 10C shows the lowest, worst case values of the transmit gain for the exemplary beam steering system 110 tested is approximately −0.5 dB for the electrowetting lens and −0.4 dB for the pressure driven lens.

Summary of Characterization Study

The main findings of the tests performed on the beam steering system 110 using the characterization system 180 are as follows: (1) a commercially off the shelf liquid lens (e.g., the Corning Varioptic A-39N0 electrowetting liquid lens) can survive and remain operable in a vacuum environment with steering performance similar when used in ambient conditions, (2) the steering dynamics of the liquid lens was characterized in ambient and vacuum conditions, which may be used in the development of a beam steering system 110 capable of steering the laser beam 124 across a hemisphere, (3) the steering range of the beam steering system 110 was measured to be approximately 2.70, which may be expanded in future demonstrations by including the amplifying optic 148 (e.g., a fisheye lens), (4) hysteresis errors were found to be small at about 0.020 and dynamics testing identified resonant peaks, which may be used to determine a desired operating frequency of the beam steering system 110, and (5) an optical simulation was performed that suggests a penalty to the transmit gain caused by wave front errors and aberration effects from the liquid lens assembly 120 may be about −0.5 dB at limiting steering angles for the Corning Varioptic A-39N0 electrowetting liquid lens and −0.4 dB for the Optotune EL-16-40-TC pressure driven liquid lens.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

The above-described embodiments can be implemented in multiple ways. For example, embodiments may be implemented using hardware, software or a combination thereof. When implemented in software, the software code can be executed on a suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in a suitable form, including a local area network or a wide area network, such as an enterprise network, an intelligent network (IN) or the Internet. Such networks may be based on a suitable technology, may operate according to a suitable protocol, and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Some implementations may specifically employ one or more of a particular operating system or platform and a particular programming language and/or scripting tool to facilitate execution.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A spacecraft, comprising:
a first laser communication transmitter to transmit a first steered laser beam from the spacecraft, the first laser communication transmitter comprising a first plurality of liquid lenses to steer a first source laser beam to provide the first steered laser beam,
wherein:
the first source laser beam propagates along a first optical axis;
at least one liquid lens of the first plurality of liquid lenses is offset from the first optical axis; and
a focal length of the at least one liquid lens is adjusted in response to an applied voltage to deflect the first source laser beam from the optical axis.

2. The spacecraft of claim 1, wherein the spacecraft does not include a gimbal or mechanical actuator to steer the first source laser beam so as to provide the first steered laser beam.

3. The spacecraft of claim 1, wherein the first plurality of liquid lenses steer the first source laser beam independently of a position and/or an orientation of the spacecraft, such that no pointing of the spacecraft is required to steer the first source laser beam so as to provide the first steered laser beam.

4. The spacecraft of claim 1, wherein the first plurality of liquid lenses comprises:
a first liquid lens offset in a first direction perpendicular to the first optical axis; and
a second liquid lens offset in a second direction perpendicular to the first direction and to the first optical axis.

5. The spacecraft of claim 4, wherein:
at least one of the first liquid lens or the second liquid lens deflects the first source laser beam to provide a first deflected laser beam; and
the first laser communication transmitter further comprises a fisheye lens to amplify an angular deflection of the first deflected laser beam to provide the first steered laser beam from the spacecraft.

6. The spacecraft of claim 5, wherein:
a first focal length of the first liquid lens is controlled via a first applied voltage to deflect the first source laser beam along a first axis perpendicular to the optical axis; and
a second focal length of the second liquid lens is controlled via a second applied voltage to deflect the first source laser beam along a second axis perpendicular to the first axis and the optical axis,
so as to point the first steered laser beam from the spacecraft in one direction of a plurality of directions over a hemisphere.

7. The spacecraft of claim 6, wherein at least one of the first liquid lens or the second liquid lens is controlled so as to vary a beam divergence of the first steered laser beam to provide a wider beamwidth and a narrower beamwidth.

8. A satellite, comprising:
a first laser communication transmitter to transmit a first steered laser beam over a first hemisphere from a first end of the satellite independently of a position and/or an orientation of the satellite; and
a second laser communication transmitter to transmit a second steered laser beam over a second hemisphere from a second end of the satellite independently of the position and/or the orientation of the satellite,
wherein:
the first laser communication transmitter and the second laser communication transmitter do not include a gimbal or mechanical actuator to transmit the first steered laser beam over the first hemisphere or the second steered laser beam over the second hemisphere;
the first laser communication transmitter comprises a first plurality of liquid lenses to provide two-axis steering of the first steered laser beam over the first hemisphere;
the second laser communication transmitter comprises a second plurality of liquid lenses to provide two-axis steering of the second steered laser beam over the second hemisphere;
the first plurality of liquid lenses steer a first source laser beam propagating along a first optical axis to provide the first steered laser beam, the first plurality of liquid lenses comprising:
a first liquid lens offset in a first direction perpendicular to the first optical axis, wherein a first focal length of the first liquid lens is controlled via a first applied voltage to deflect the first source laser beam along a first axis perpendicular to the first optical axis; and
a second liquid lens offset in a second direction perpendicular to the first direction and to the first optical axis, wherein a second focal length of the second liquid lens is controlled via a second applied voltage to deflect the first source laser beam along a second axis perpendicular to the first axis and the first optical axis; and
the second plurality of liquid lenses steer a second source laser beam propagating along a second optical axis to provide the second steered laser beam, the second plurality of liquid lenses comprising:

a third liquid lens offset in a third direction perpendicular to the second optical axis, wherein a third focal length of the third liquid lens is controlled via a third applied voltage to deflect the second source laser beam along a third axis perpendicular to the second optical axis; and a fourth liquid lens offset in a fourth direction perpendicular to the third direction and to the second optical axis, wherein a fourth focal length of the fourth liquid lens is controlled via a fourth applied voltage to deflect the second source laser beam along a fourth axis perpendicular to the third axis and the second optical axis.

9. The satellite of claim 8, wherein:

the first laser communication transmitter further comprises a first fisheye lens to amplify a first angular deflection of the deflected first source laser beam to provide the first steered laser beam from the satellite; and the second laser communication transmitter further comprises a second fisheye lens to amplify a second angular deflection of the deflected second source laser beam to provide the second steered laser beam from the satellite.

10. The satellite of claim 9, wherein:

the first laser communication transmitter further comprises first folded optics in a first beam path of the deflected first source laser beam; and the second laser communication transmitter further comprises second folded optics in a second beam path of the deflected second source laser beam.

11. The satellite of claim 10, wherein the satellite is a 3U CubeSat.

12. The satellite of claim 9, wherein:

at least one of the first liquid lens or the second liquid lens is controlled so as to vary a first beam divergence of the first steered laser beam; and at least one of the third liquid lens or the fourth liquid lens is controlled so as to vary a second beam divergence of the second steered laser beam.

13. The satellite of claim 9, wherein:

the first laser communication transmitter further comprises at least one first beam splitter to facilitate monitoring and adjusting of the first angular deflection of the deflected first source laser beam; and the second laser communication transmitter further comprises at least one second beam splitter to facilitate monitoring and adjusting of the second angular deflection of the deflected second source laser beam.

14. The satellite of claim 9, wherein:

the first laser communication transmitter is a first laser communication transceiver to receive, over the first hemisphere and via the first fisheye lens, a third steered laser beam from a first other satellite, the first laser communication transceiver further comprising a first MEMS shutter array adjustable iris to reduce a first field of view over the first hemisphere to substantially block first noise beyond the received third steered laser beam from the first other satellite; and the second laser communication transmitter is a second laser communication transceiver to receive, over the second hemisphere and via the second fisheye lens, a fourth steered laser beam from the first other satellite or a second other satellite, the second laser communication transceiver further comprising a second MEMS shutter array adjustable iris to reduce a second field of view over the second hemisphere to substantially block noise second beyond the received fourth steered laser beam from the first other satellite or the second other satellite.

15. A satellite constellation comprising a plurality of satellites, each satellite comprising:

a first laser communication transceiver to transmit a first steered laser beam over a first hemisphere to another satellite of the satellite constellation and to receive a second steered laser beam over the first hemisphere from the other satellite of the satellite constellation, the first laser communication transceiver comprising a first plurality of liquid lenses to steer a first source laser beam over multiple axes to provide the first steered laser beam over the first hemisphere, wherein at least one liquid lens of the first plurality of liquid lenses is controlled to vary a beam divergence of the first steered laser beam to provide a wider-beamwidth beacon to the other satellite and a narrower-band communication crosslink to the other satellite.

16. The satellite constellation of claim 15, wherein the narrower-band communication crosslink has a data rate of at least 20 Mbps.

* * * * *